Figure 5:
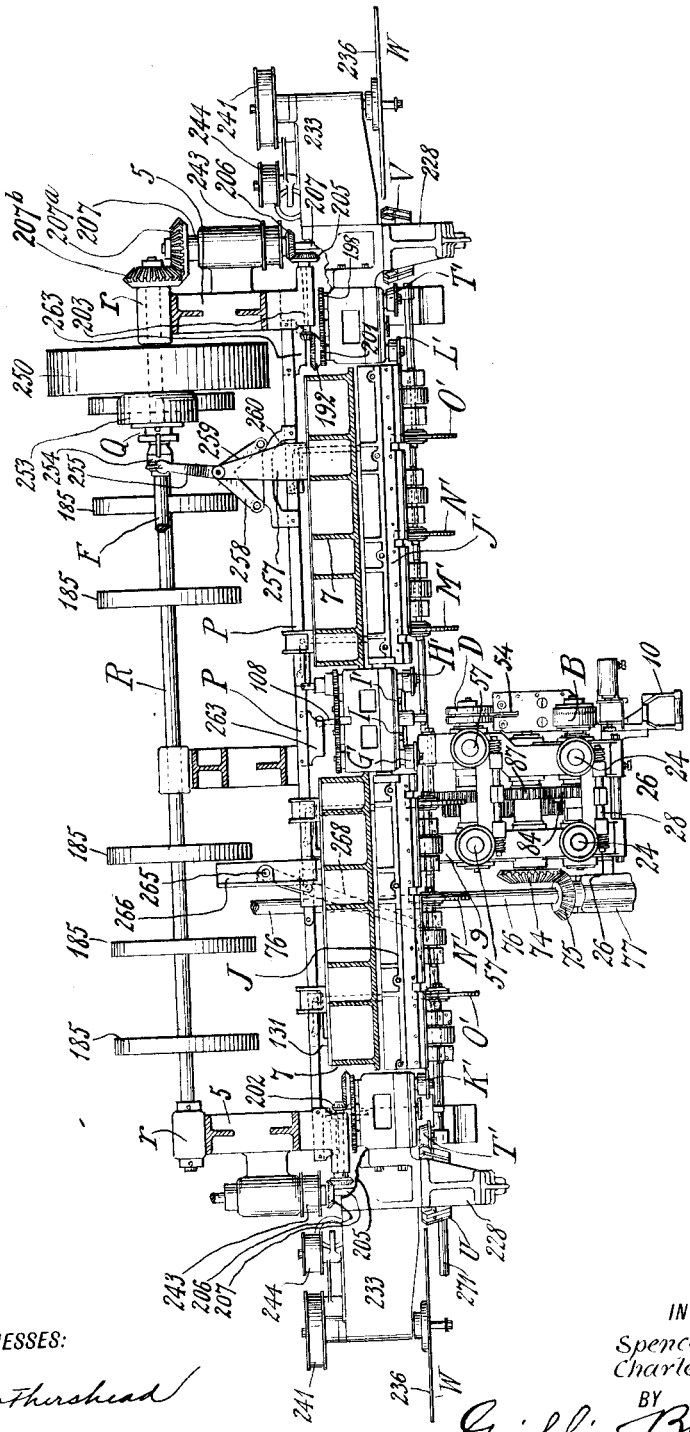

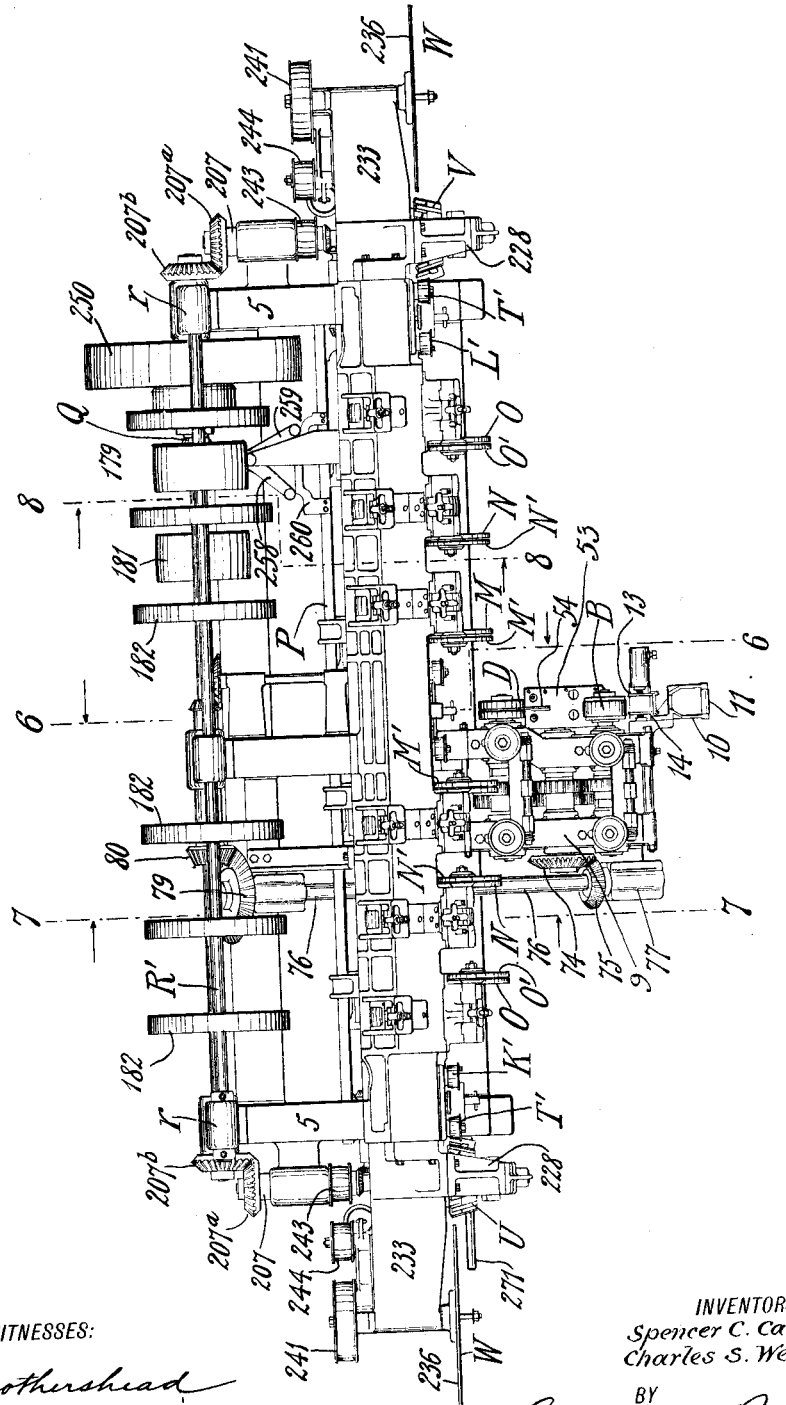

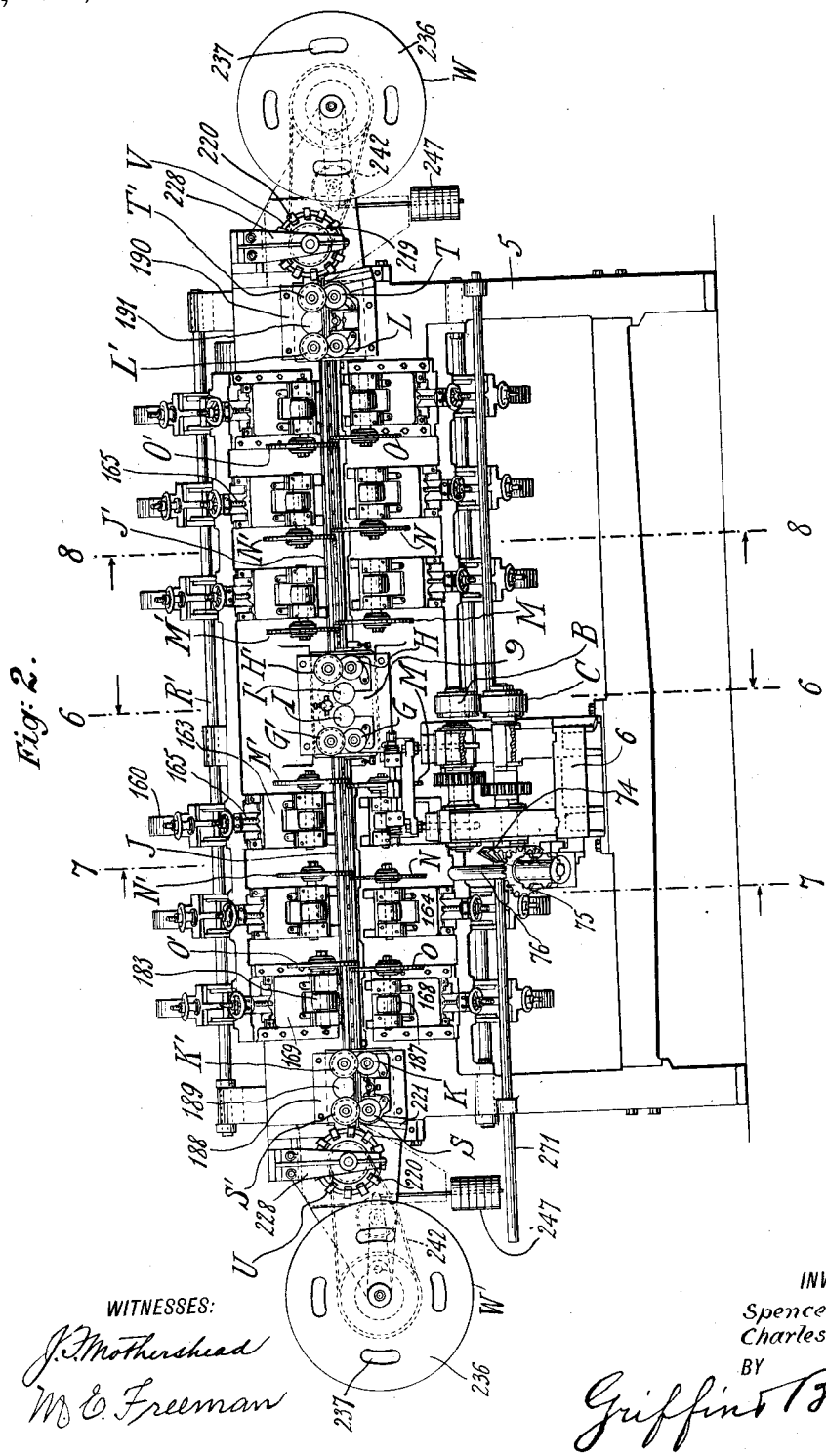

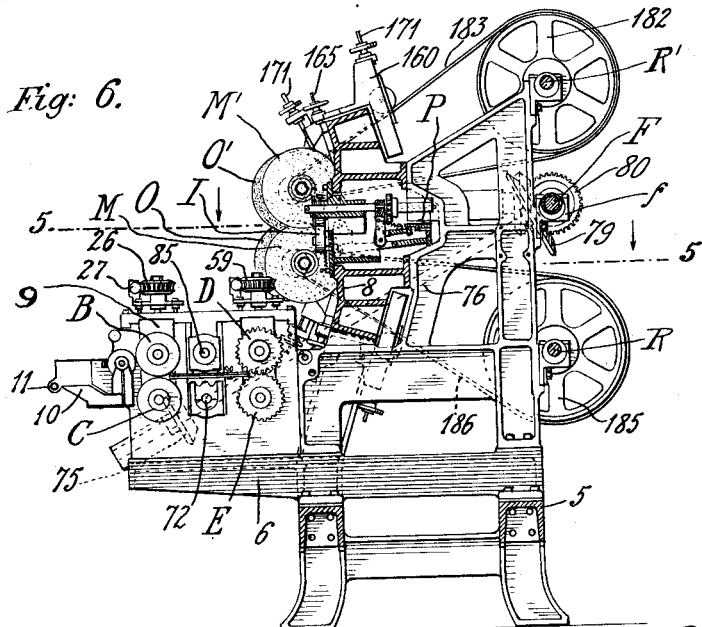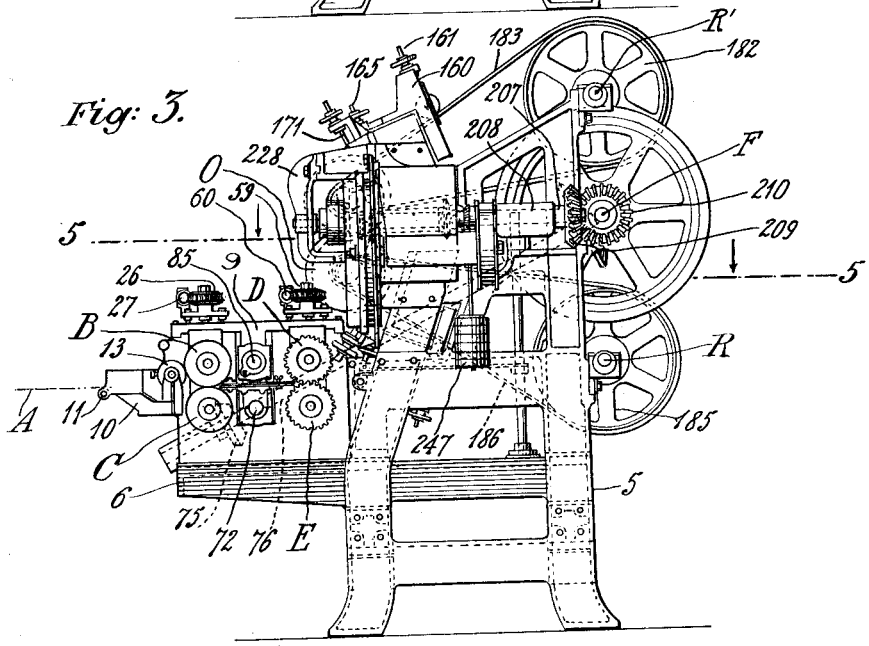

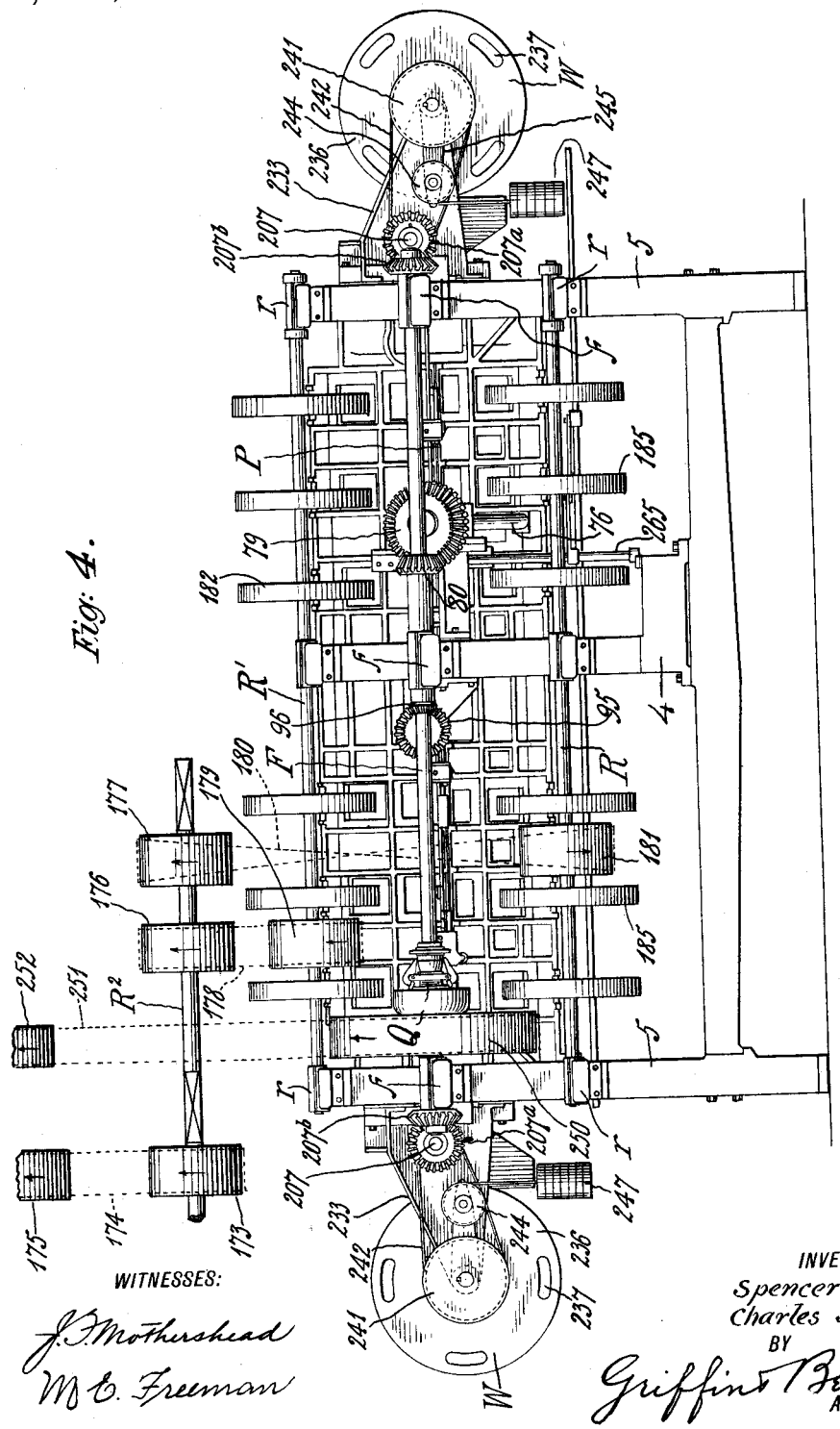

S. C. CARY & C. S. WEEKS.
MACHINE FOR MAKING CORRUGATED FASTENERS.
APPLICATION FILED JULY 22, 1912.

1,172,257.

Patented Feb. 22, 1916.
22 SHEETS—SHEET 5.

WITNESSES:
J. Mothershead
M. E. Freeman.

INVENTORS
Spencer C. Cary.
Charles S. Weeks
BY
Griffin Bernhard
ATTORNEYS

S. C. CARY & C. S. WEEKS.
MACHINE FOR MAKING CORRUGATED FASTENERS.
APPLICATION FILED JULY 22, 1912.

1,172,257.

Patented Feb. 22, 1916.
22 SHEETS—SHEET 6.

WITNESSES:
J. Mothershead
M. E. Freeman

INVENTORS
Spencer C. Cary
Charles S. Weeks
BY
Griffin & Bernhard
ATTORNEYS.

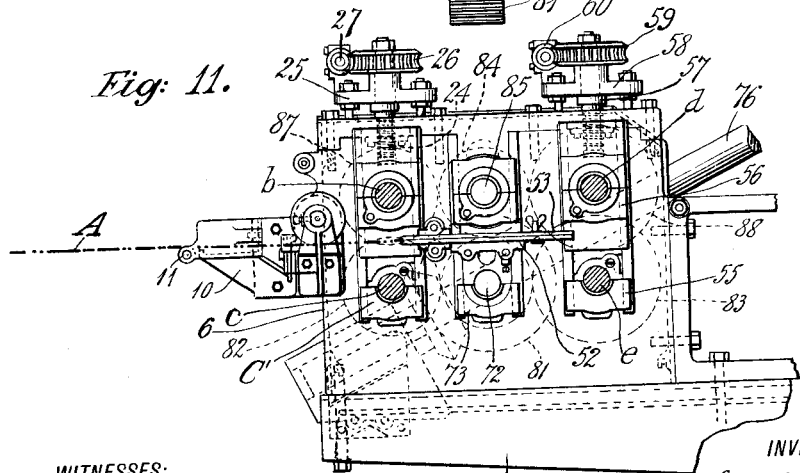

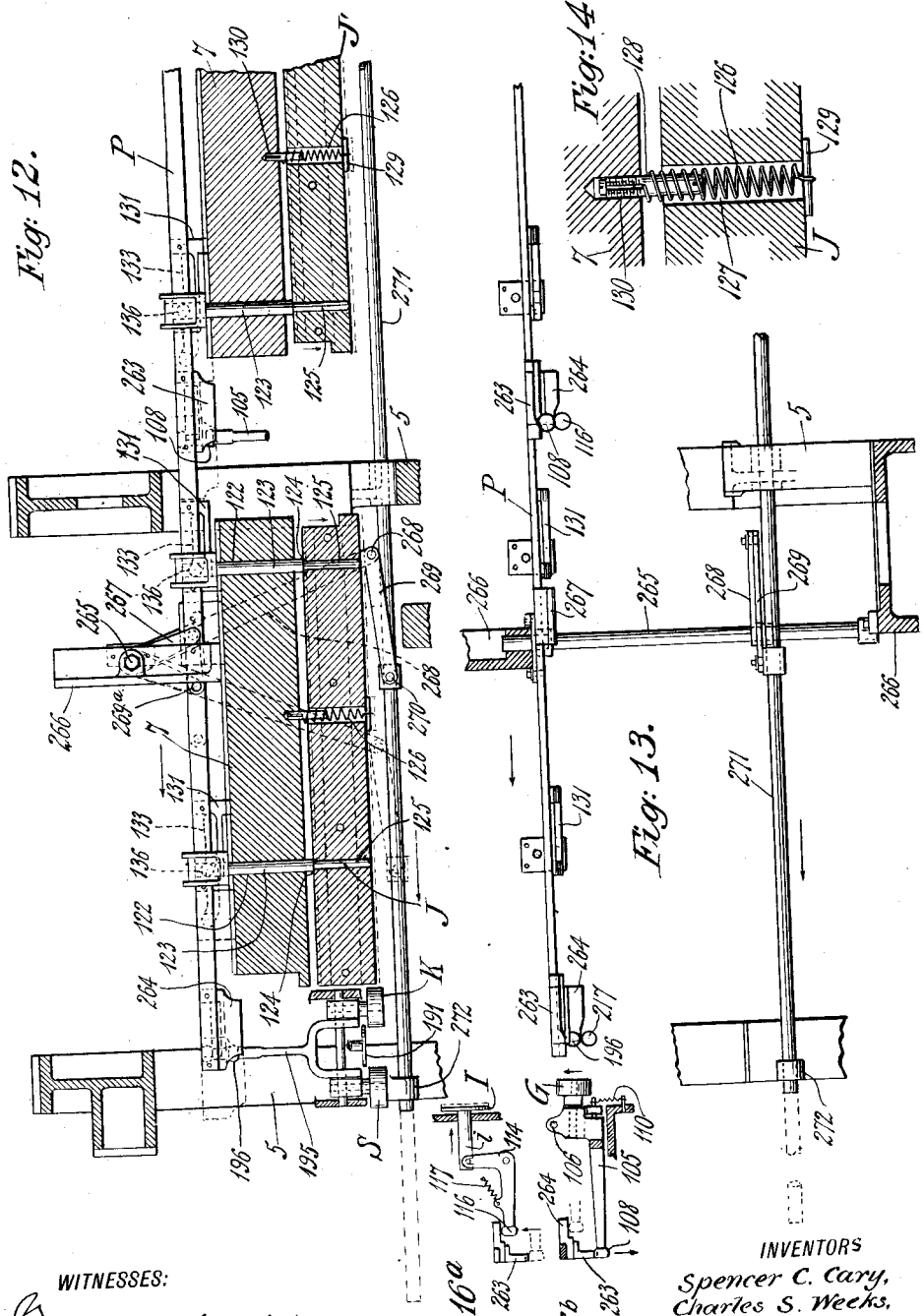

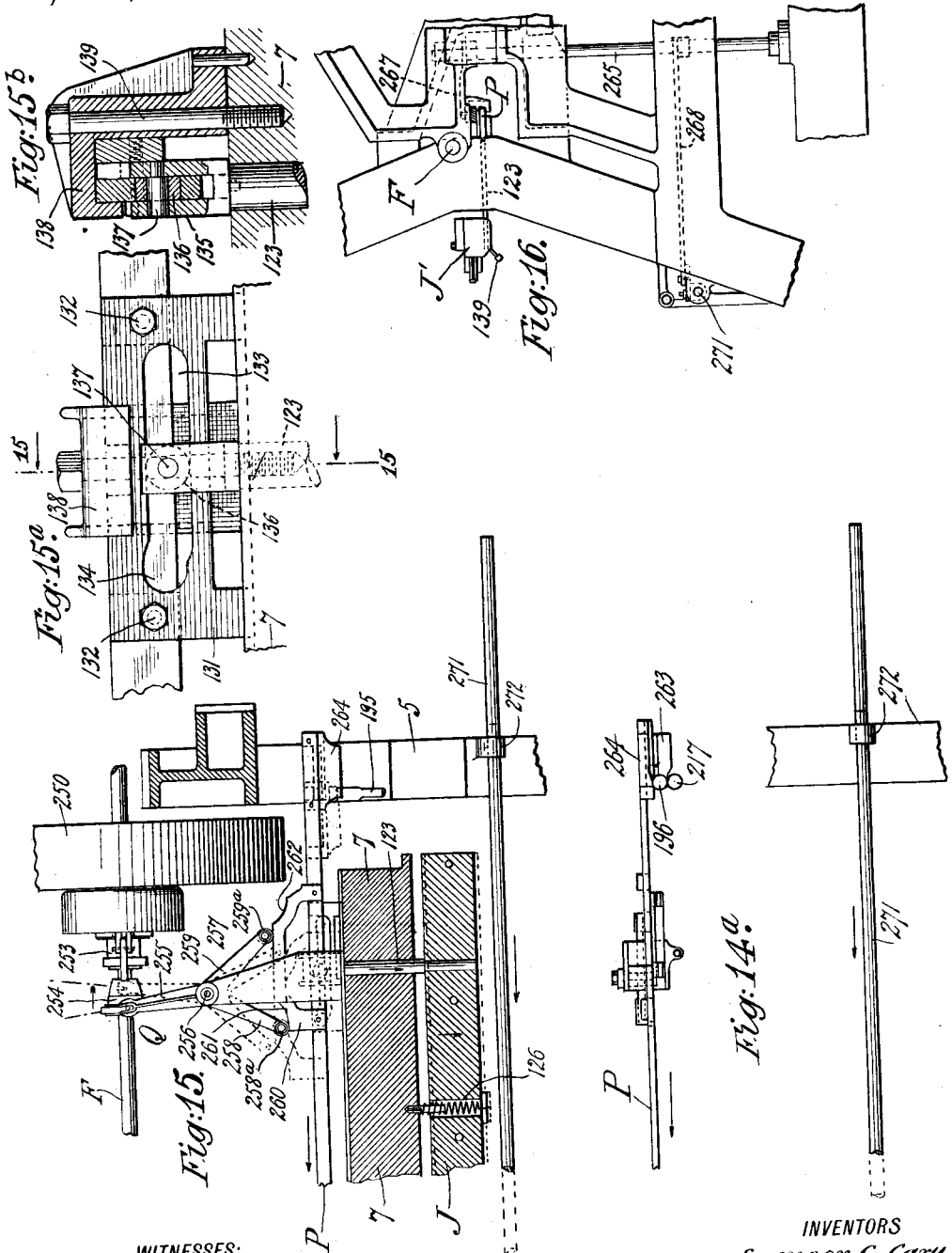

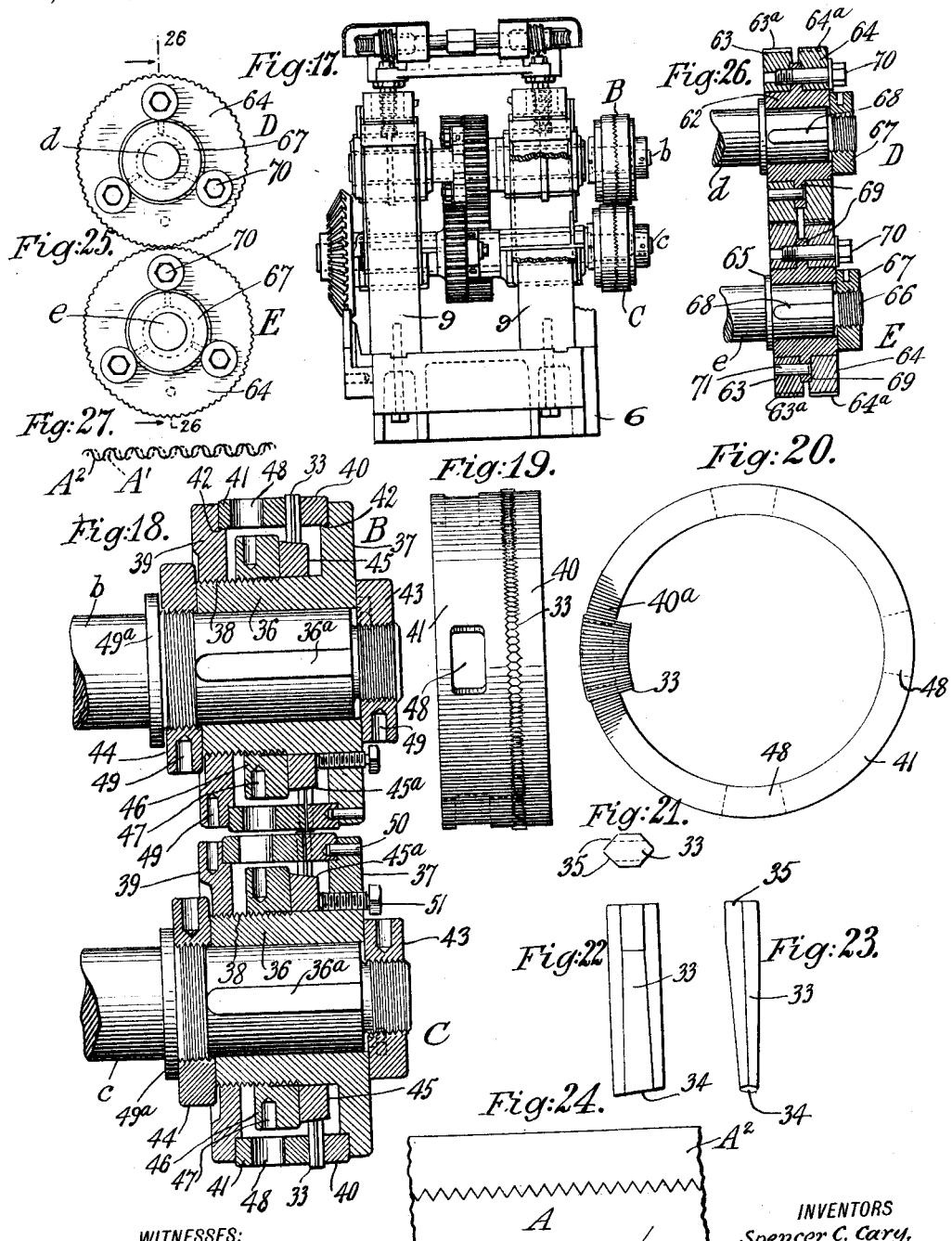

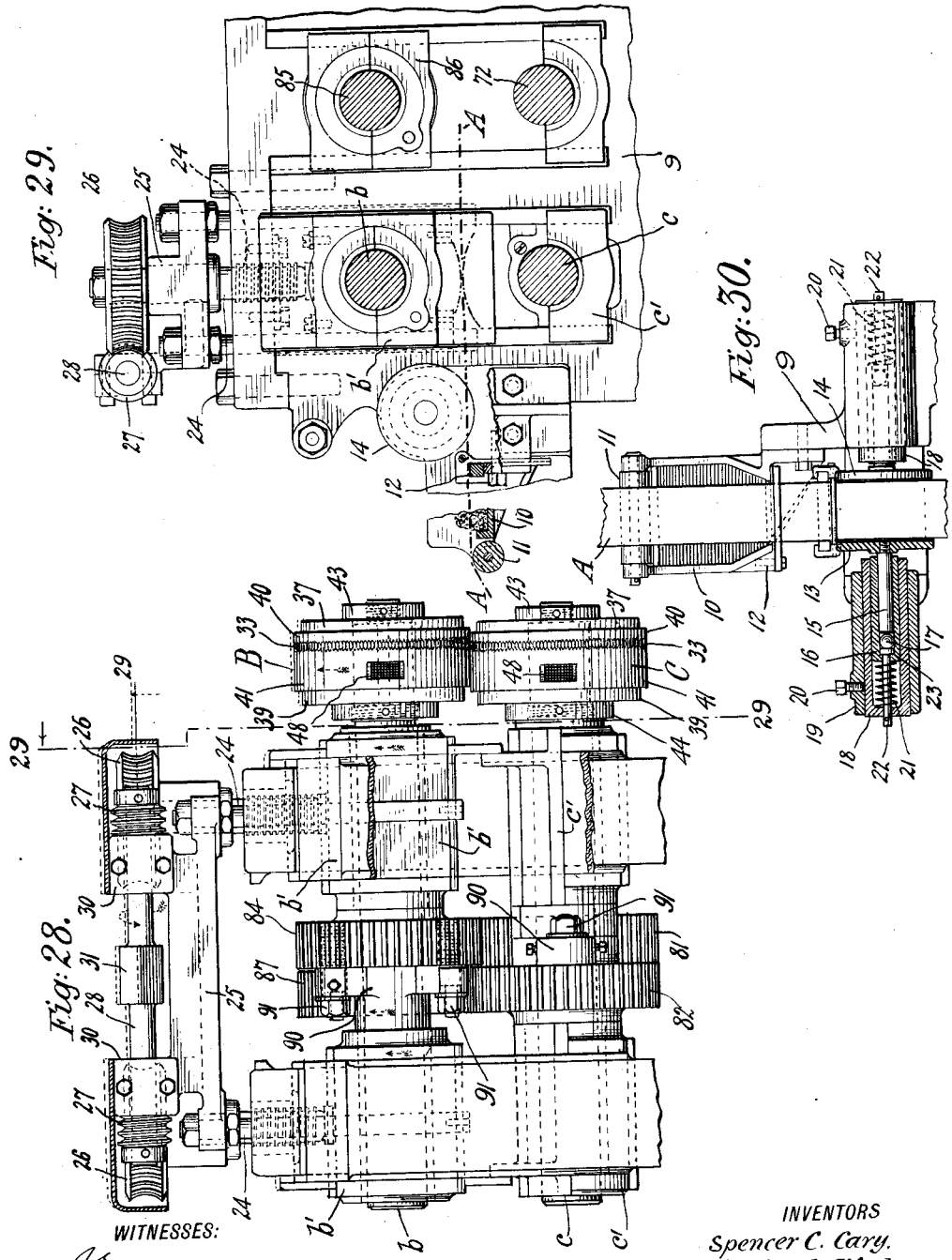

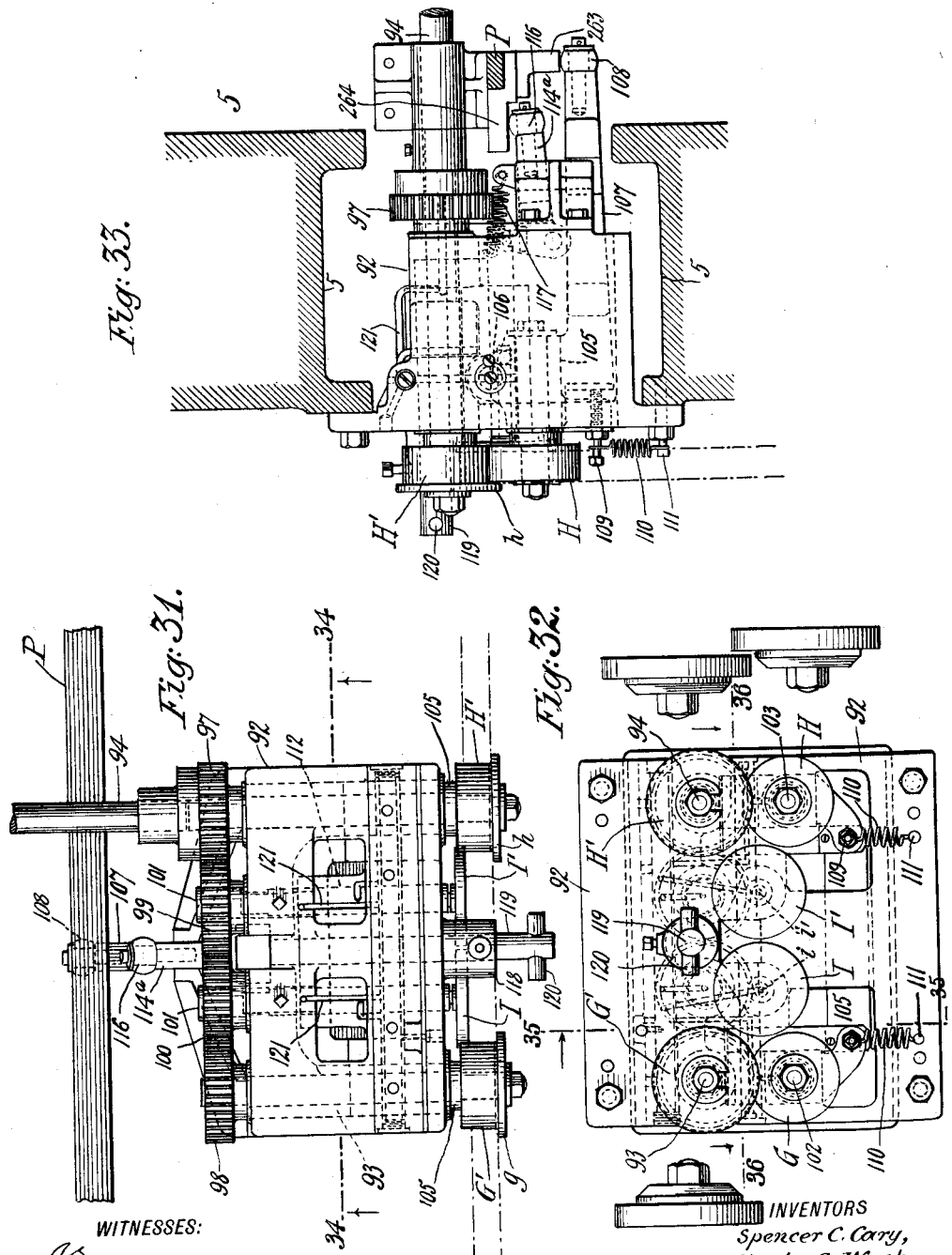

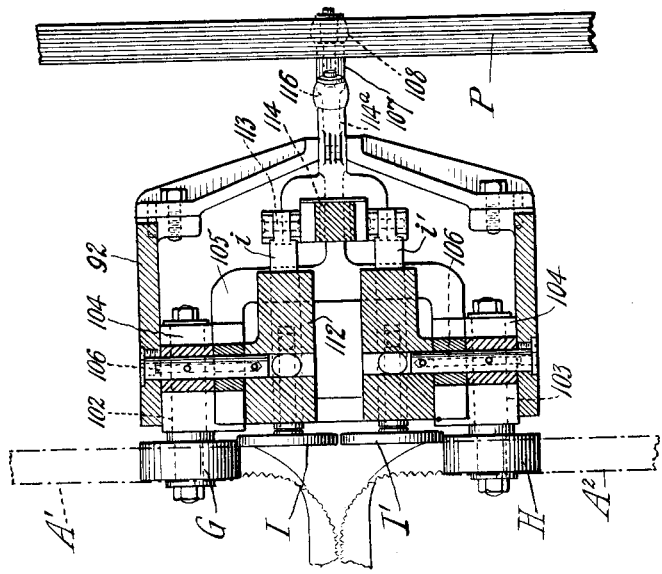

S. C. CARY & C. S. WEEKS.
MACHINE FOR MAKING CORRUGATED FASTENERS.
APPLICATION FILED JULY 22, 1912.
1,172,257.
Patented Feb. 22, 1916.
22 SHEETS—SHEET 14.
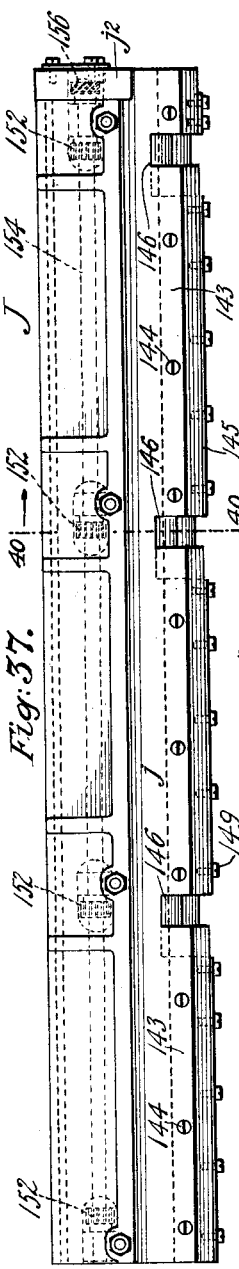
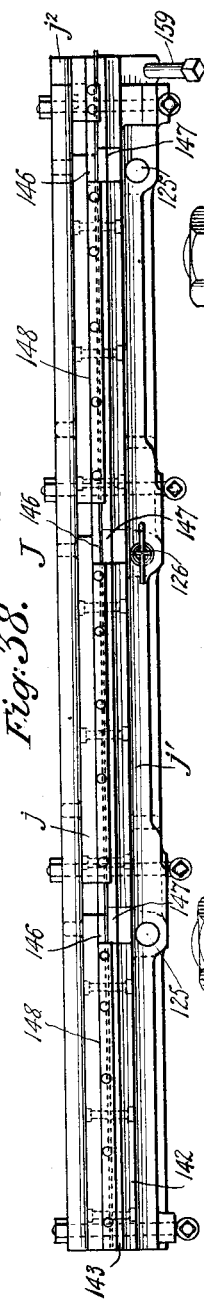
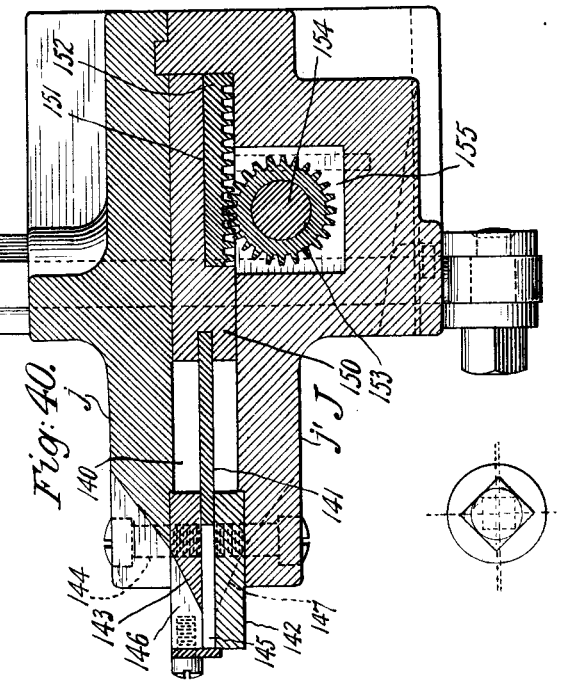
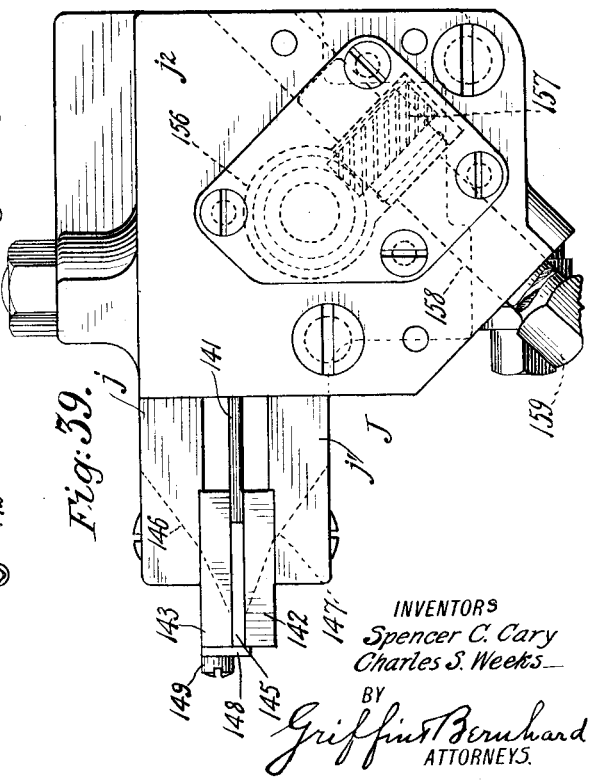
INVENTORS
Spencer C. Cary
Charles S. Weeks
BY
Griffin Bernhard
ATTORNEYS.

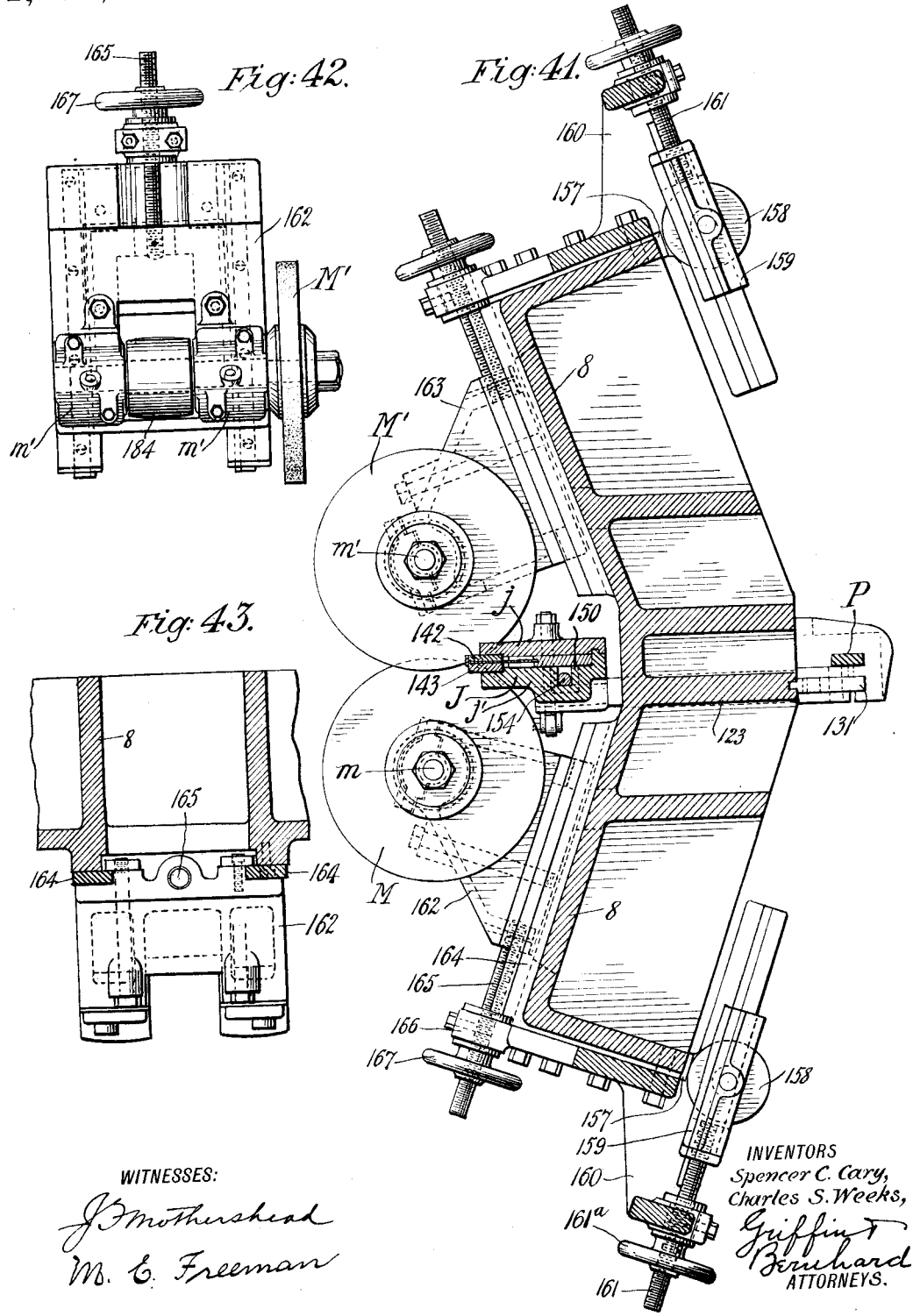

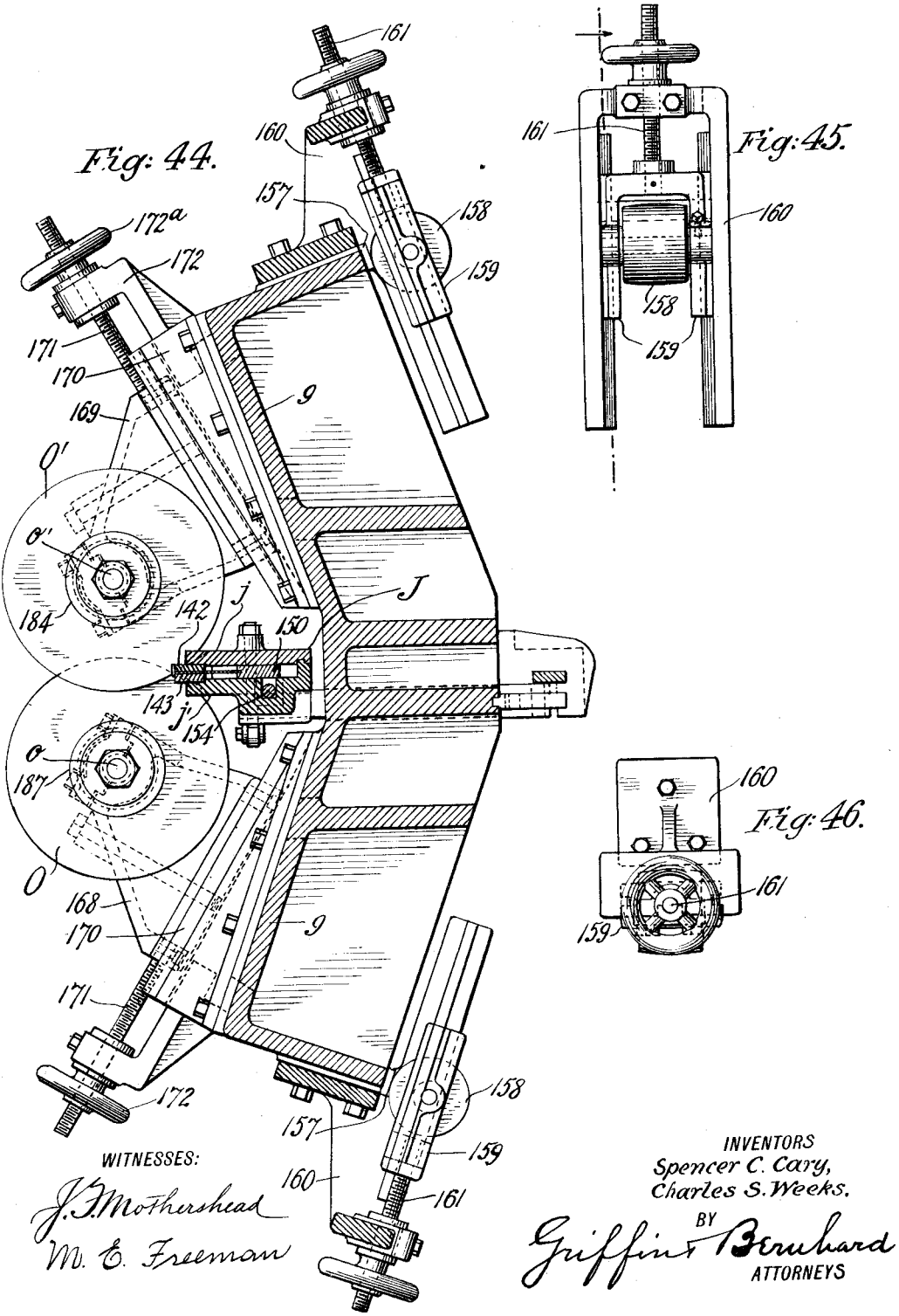

S. C. CARY & C. S. WEEKS.
MACHINE FOR MAKING CORRUGATED FASTENERS.
APPLICATION FILED JULY 22, 1912.

1,172,257.

Patented Feb. 22, 1916.
22 SHEETS—SHEET 17.

WITNESSES:
J. B. Mothershead
M. E. Freeman

INVENTORS
Spencer C. Cary,
Charles S. Weeks.
BY
Griffin & Bernhard
ATTORNEYS

S. C. CARY & C. S. WEEKS.
MACHINE FOR MAKING CORRUGATED FASTENERS.
APPLICATION FILED JULY 22, 1912.

1,172,257.

Patented Feb. 22, 1916.
22 SHEETS—SHEET 18.

WITNESSES:
J. D. Mothershead
M. E. Freeman

INVENTORS
Spencer C. Cary,
Charles S. Weeks,
BY
Griffin & Bernhard
ATTORNEYS

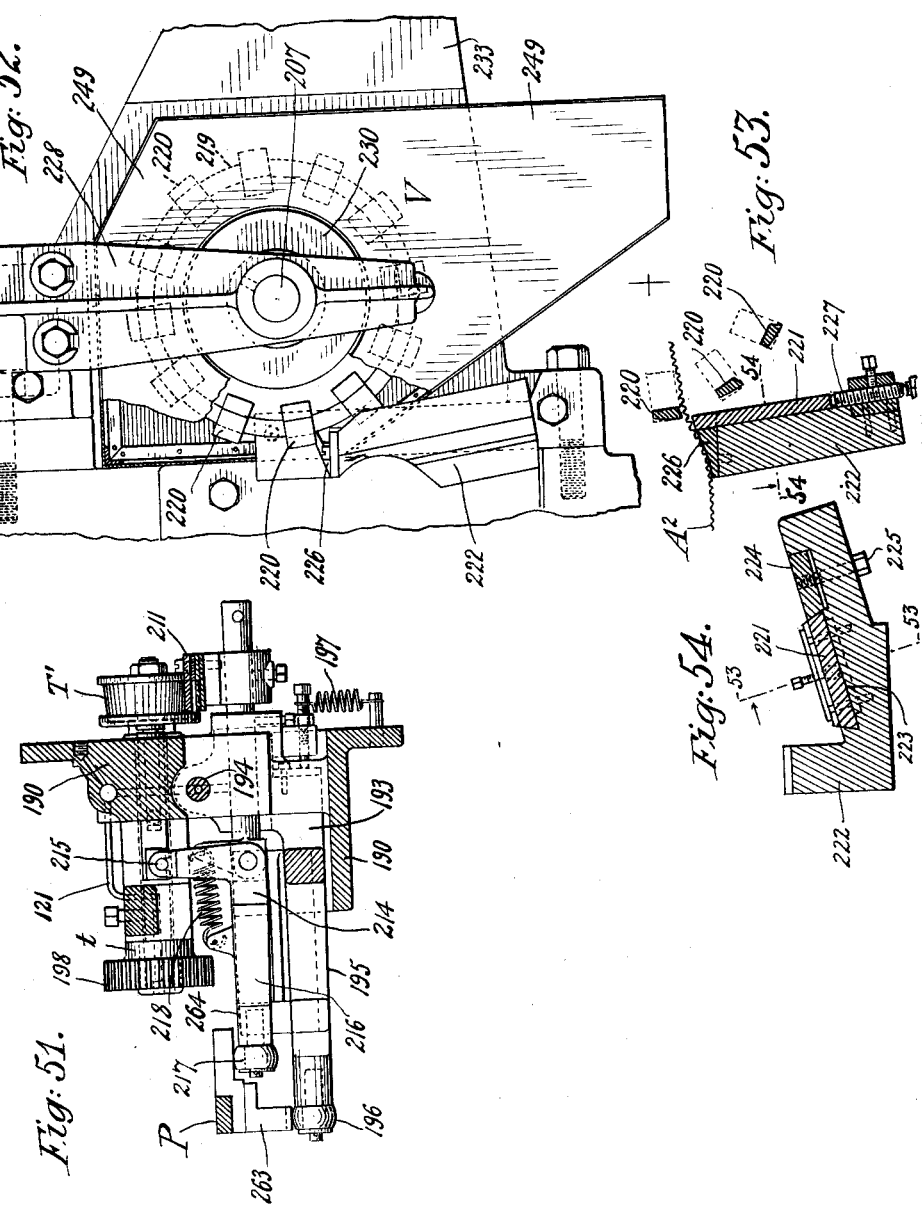

S. C. CARY & C. S. WEEKS.
MACHINE FOR MAKING CORRUGATED FASTENERS.
APPLICATION FILED JULY 22, 1912.
1,172,257.
Patented Feb. 22, 1916.
22 SHEETS—SHEET 20.
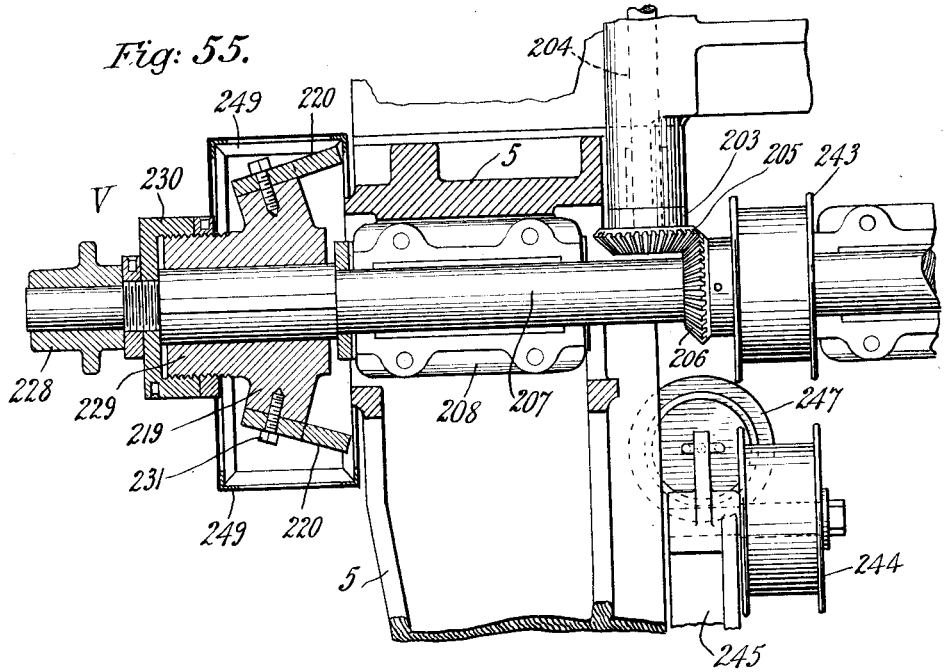
Fig: 55.
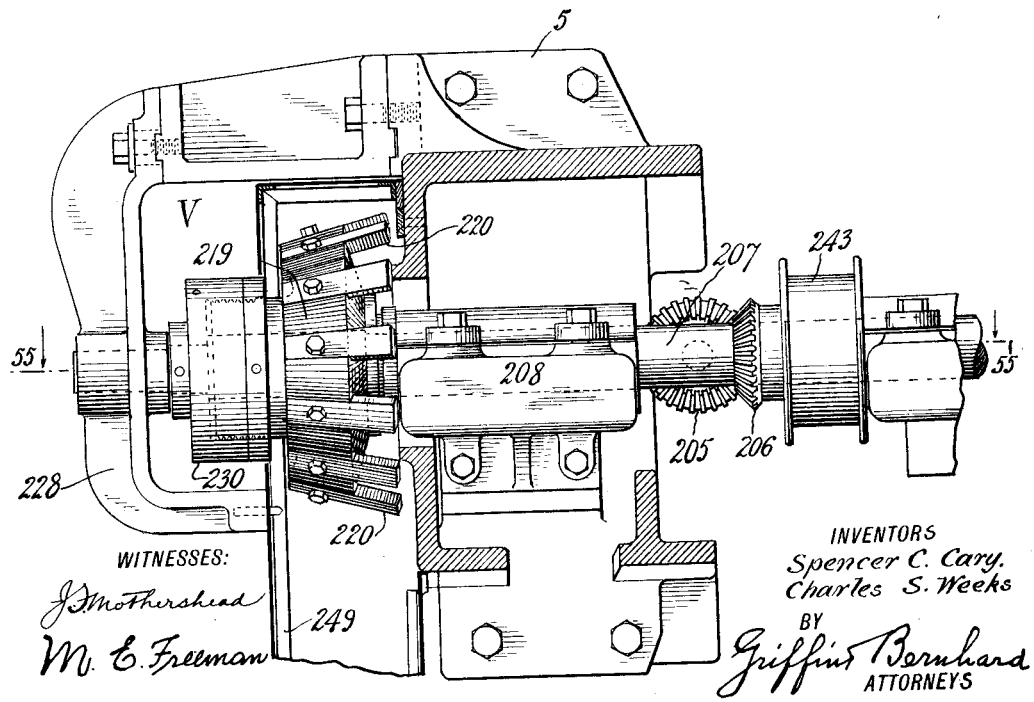
Fig: 56.
WITNESSES:
J Mothershead
M. E. Freeman
INVENTORS
Spencer C. Cary,
Charles S. Weeks
BY
Griffin Bernhard
ATTORNEYS

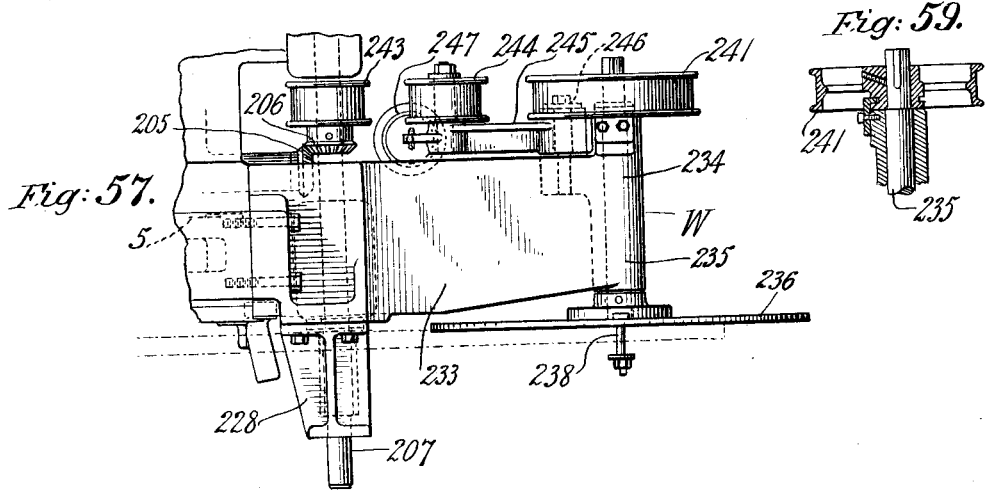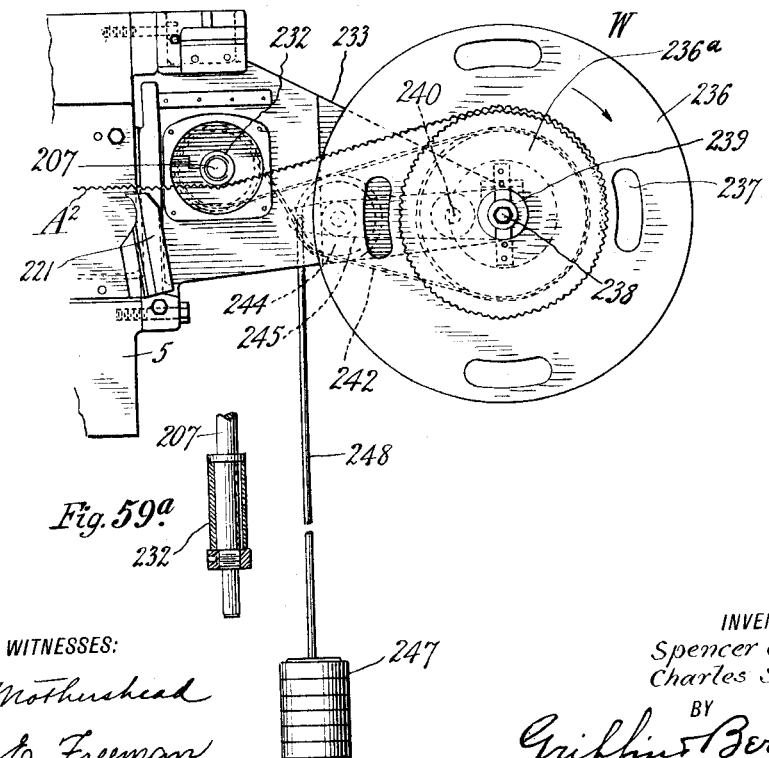

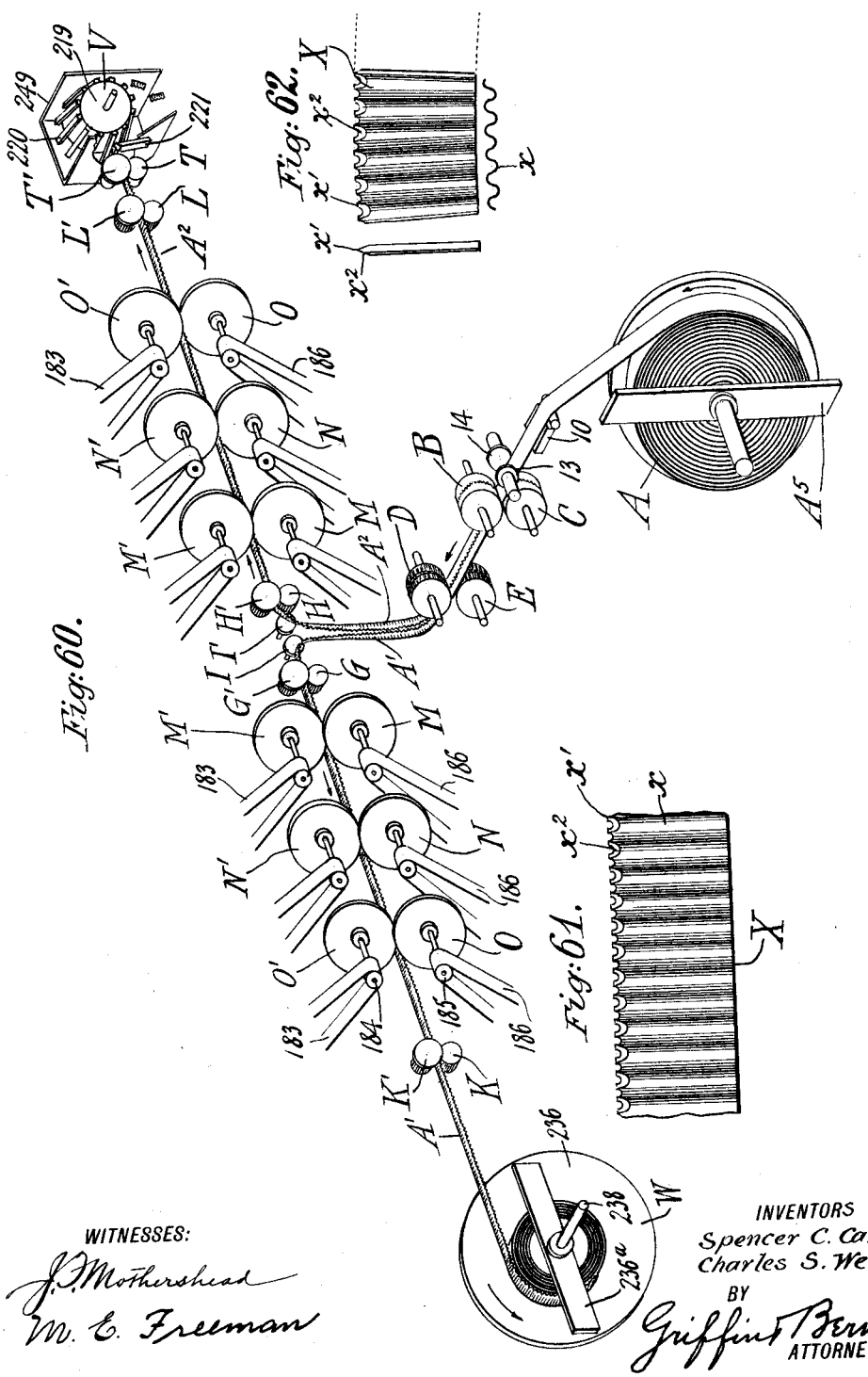

UNITED STATES PATENT OFFICE.

SPENCER C. CARY AND CHARLES S. WEEKS, OF NEW YORK, N. Y.; SAID WEEKS ASSIGNOR TO CARY MANUFACTURING COMPANY, OF NEW YORK, N. Y., A CORPORATION OF NEW YORK.

MACHINE FOR MAKING CORRUGATED FASTENERS.

1,172,257. Specification of Letters Patent. Patented Feb. 22, 1916.

Application filed July 22, 1912. Serial No. 710,963.

*To all whom it may concern:*

Be it known that we, SPENCER C. CARY and CHARLES S. WEEKS, both citizens of the United States, residing in the city of New York, borough of Brooklyn, county of Kings, and State of New York, have invented a certain new and useful Machine for Making Corrugated Fasteners, of which the following is a specification.

This invention is a machine for making corrugated fasteners, particularly box or shock fasteners, and the main objects of the invention are to make such fasteners very speedily and without loss of metal, thereby resulting in great economy of production, as well as in the efficiency of the resulting article due to novel features of construction therein.

The invention, in its broad aspect, embodies not only a machine for producing the fasteners, but, also, a novel fastener, as well as a distinctly novel method of making such article. While the said article and method are hereinafter described in conjunction with the machine, they will form the subject matter of a separate application or applications to be filed as a division or divisions of the present application.

In carrying the invention into effect, we start with flat metal stock, having substantially twice the width of the fasteners which it is proposed to make, and slit the said stock medially and longitudinally along a substantially zig-zag line whereby two strips having a serrated edge are produced without any loss or waste of metal. This slitting operation is preferably performed by rotary punches, two series of which are employed. After the stock is slitted as described, it passes to corrugating rolls. For this purpose, we preferably employ rollers having a double face so as to operate simultaneously on the strips of serrated metal, this operation resulting in two corrugated strips having serrations along the line of cut, *i. e.*, having the serrations of one strip pointing toward those in the other. The corrugated and serrated strips produced as described are then passed to suitable grinding mechanism for the purpose of sharpening the serrated edge of the respective strips whereby a penetrating edge is formed on said strips. In the preferred way of sharpening or grinding the serrated edge of the strips, two or more sets of grinders are employed to operate on each strip, the first set or sets serving to produce the desired bevel on said serrated edge and the final set to not only remove the bur whereby the sharpening is completed, but to, also, give a form to the edge which is strong and enables the teeth to penetrate easily into the wood. The corrugated strips with the serrated edges produced as described may now be coiled for shipment. In the preferred form of our machine, however, as an alternative to the said coiling, we embody means for cutting the strips into pieces of the desired length for driving. As will appear from the disclosure herein, we may coil one of the strips and cut the other into such lengths as desired.

In a preferred form of our machine we provide mechanism which operates on the sharpened strip, prior to cutting the same, for the purpose of diverging the corrugations toward the driving edge, whereby the serrated edge becomes somewhat convex and the driving edge slightly concave, thereby resulting in a corrugated fastener of substantially fan shape form. A fastener of this form is distinctly novel, and possesses pronounced advantages over prior constructions of fasteners, residing in the fact, mainly, that the new fasteners when driven into the wood so compress the same as to practically preclude dislodgment of said fasteners.

Various other features of novelty pertaining to our invention, not hereinbefore adverted to, will appear from the following detailed description taken in conjunction with the accompanying drawings.

In the accompanying drawings, we have illustrated one practical embodiment of the invention, but the construction shown therein is to be understood as illustrative, only, and not as defining the limits of the invention.

Figure 7:
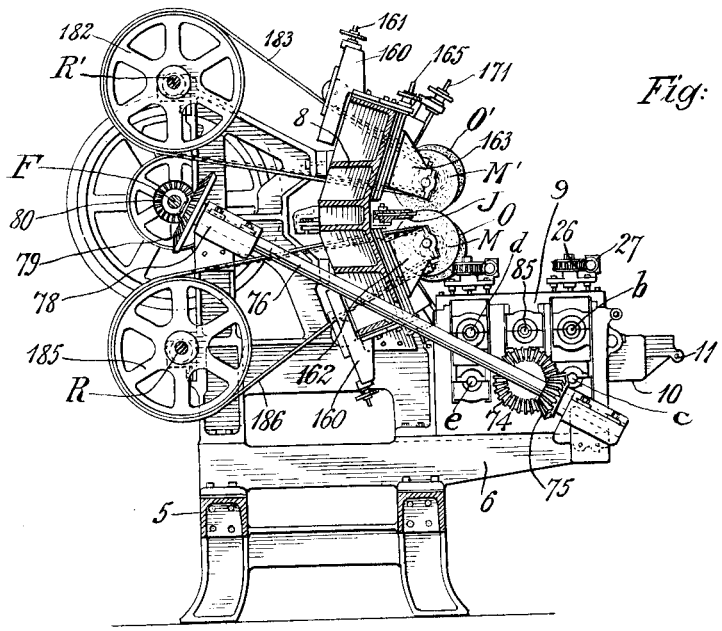
Figure 8:
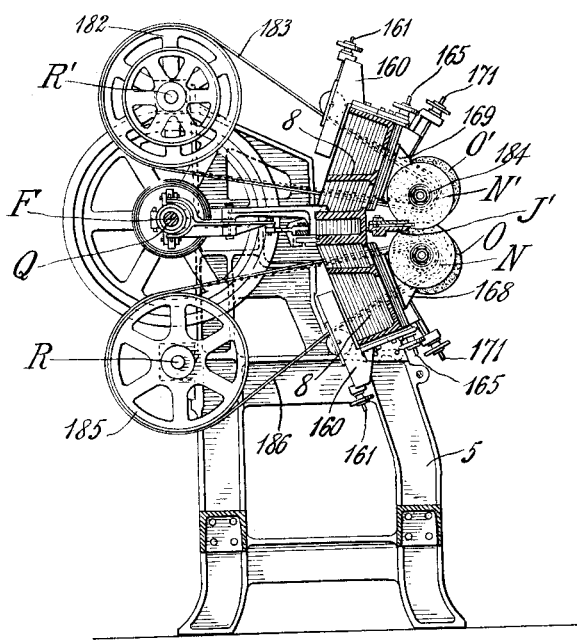
Figure 47:
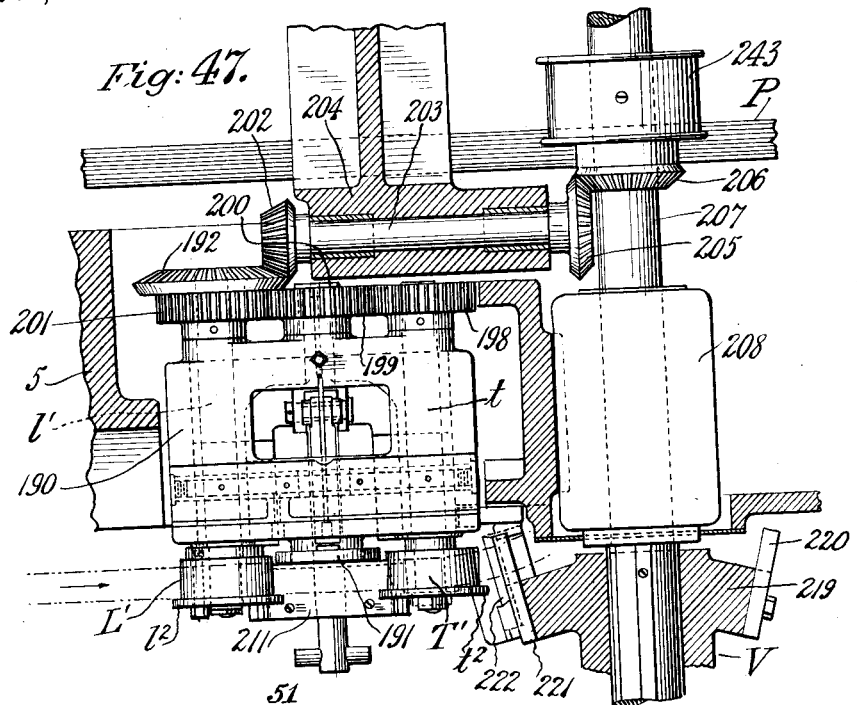
Figure 48:
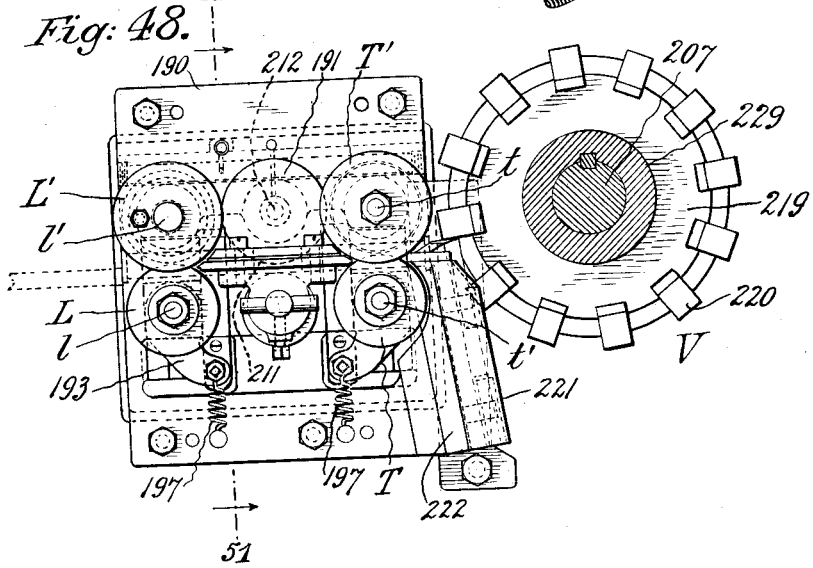
Figure 49:
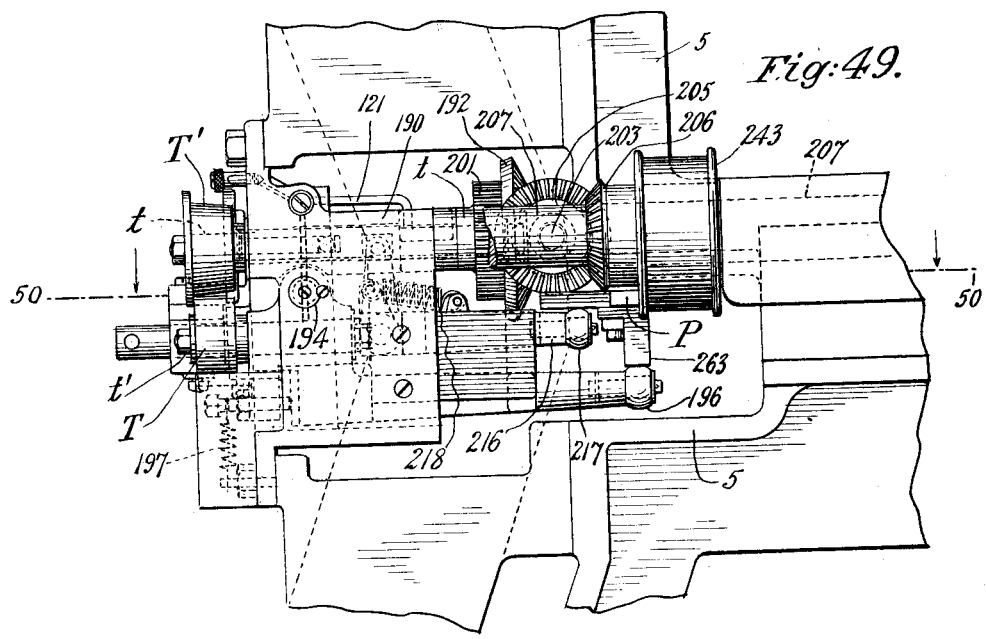
Figure 50:
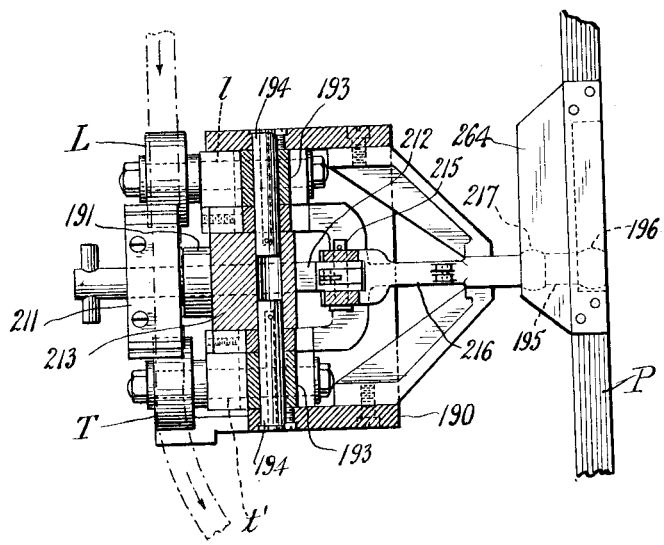

Figure 1 is a plan view of a machine for making corrugated fasteners embodying this invention. Fig. 2 is a front elevation thereof. Fig. 3 is an elevation looking at the right hand end of the machine in Figs. 1 and 2. Fig. 4 is a rear elevation. Fig. 5 is a sectional plan view, the plane of the section being indicated by the dotted line 5—5 of Fig. 3. Figs. 6, 7 and 8 are vertical cross sections on the lines 6—6, 7—7 and 8—8, respectively, of Figs. 1 and 2. Fig. 9 is a plan view, on a scale somewhat enlarged over Figs. 1 to 8, inclusive, showing the stock slitting and stock corrugating mechanisms, the plain stock and the resulting corrugated material being shown. Fig. 10 is a detail view illustrating a part of the square gearing between the main roll-driving shaft and the lower shafts for the lower slitting and corrugating rolls, the wide-faced gear meshing, also, with an intermediate gear which meshes in turn with gears on the shafts of the upper rolls, whereby the two slitting rolls and the two corrugating rolls are adapted to be simultaneously driven in unison with each other. Fig. 11 is a side elevation of the mechanisms shown in Fig. 9. Fig. 12 is a plan view, partly in horizontal section, of the cam bar mechanism by which the guide mechanism for the corrugated material may be moved relatively to the series of grinding mechanisms in conjunction with the operations of starting and stopping the other parts of the machine. Fig. 13 is an elevation of certain of the parts of the cam bar mechanism illustrated in Fig. 12. Figs. 14, 14ª, 15, 15ª, and 15ᵇ are detail views of parts of the cam bar mechanism to be hereinafter described, Fig. 15ᵇ being a vertical section on the line 15—15 of Fig. 15ª. Fig. 16 is a detail view, in side elevation, of one of the machine-frame members illustrating the position of the guide for the corrugated stock and certain of the devices by which said guide may be controlled by the operation of the cam bar mechanism. Fig. 16ª is a diagrammatic view illustrating the operation of one of the guide disks positioned for engagement with the straight back edge of the corrugated and toothed metal strip, whereby upon the withdrawal of said strip from the grinding mechanisms the guide disk is moved rearwardly in unison with the withdrawing movement of the metal strip. Fig. 16ᵇ is another diagrammatic view illustrating the operation of one of the corrugated feed rolls or one of the diverging rolls whereby said rolls are released from engagement with the corrugated metal strip after the latter is withdrawn from the action of the grinding mechanisms. Fig. 17 is an end elevation of the slitting roll mechanism. Fig. 18 is an enlarged vertical section through the pair of coöperating stock-slitting rolls. Figs. 19 and 20 are detail views, in front and side elevation, respectively, of one of the slitting rolls. Figs. 21, 22 and 23 are enlarged end and side views of one of the punches, a series of which is carried by each of the stock-slitting rolls. Fig. 24 is a plan view of a portion of the metal stock after it has been subjected to the action of the stock-slitting mechanism and prior to the action of the corrugating rolls, for the purpose of producing two strips of material with teeth on their adjacent edges. Fig. 25 is an end view of the coöperating corrugating rolls, and Fig. 26 is a vertical section on the line 26—26 of Fig. 25. Fig. 27 is an edge view of one of the corrugated strips, the relative positions of the corrugations in the other strip being shown by dotted lines. Fig. 28 is an elevation of the stock-slitting mechanism similar to Fig. 17 but on a larger scale, illustrating the means by which a vertical adjustment of the upper slitting roll is secured. Fig. 29 is a vertical section on the line 29—29 of Fig. 28. Fig. 30 is a plan view illustrating the means employed for lubricating and guiding the stock when introducing the same into the machine. Fig. 31 is a plan view of the feed mechanism for the two strips of corrugated metal, said feed mechanism being positioned above and in advance of the corrugating mechanism for the purpose of directing one of the corrugated strips in one direction lengthwise the machine and for directing the other corrugated strip in an opposite direction lengthwise the machine. Fig. 32 is a front view of the feeding mechanism for the corrugated strips illustrated in Fig. 31. Fig. 33 is an end elevation of the feeding mechanism illustrated in Figs. 31 and 32. Fig. 34 is a vertical section on the line 34—34 of Fig. 31 taken longitudinally through the feeding mechanism for the two corrugated strips. Fig. 35 is a vertical transverse section on the line 35—35 of Fig. 32. Fig. 36 is a horizontal section through said feeding mechanism on the line 36—36 of Fig. 32. Fig. 37 is a plan view on an enlarged scale illustrating one of the stock guides through which is adapted to pass one of the corrugated strips, two of said guide boxes being employed for receiving two corrugated strips and for presenting said strips to the grinding mechanisms. Fig. 38 is a view in front elevation of the guide box or stock guide for the corrugated strip shown in Fig. 37. Fig. 39 is an enlarged view in end elevation of the stock guide or guide box for the corrugated strip. Fig. 40 is a vertical cross section, on the scale of Fig. 39, through one of the guide boxes, the plane of the section being indicated by the dotted line 40—40 of Fig. 37. Fig. 41 is a vertical section through the body of the machine, partly in elevation, on an enlarged scale, illustrating a pair of the grinding mechanisms employed for producing two bevels on the toothed edge of a corrugated strip. Fig. 42 is a front elevation illustrating the means for supporting and adjusting one of the grinding heads of the grinding mechanism illustrated in Fig. 41. Fig. 43 is a transverse section through the bed of the grinding mechanism shown in Fig. 41. Fig. 44 is a vertical section, partly in elevation, illustrating another pair of the grinding mechanisms employed in the machine, said grinding mechanisms operating on the toothed edge of the corrugated material at different angles from the grinding mechanisms of Fig. 44 in order that said grinding mechanisms of Fig. 44 may impart the desired finish to the beveled and toothed edge of the corrugated stock. Fig. 45 is a detail view in front elevation of the means employed for adjusting the tension upon a grinding head belt. Fig. 46 is a plan view of the adjusting device illustrated in Fig. 45. Fig. 47 is a plan view, partly in horizontal section, of an end feed together with a diverging mechanism and a cutter head whereby a corrugated strip may be subjected to pressure to render the fastener divergent and said strip may be cut into fasteners of the required length. Fig. 48 is a view in front elevation, partly in section, of the mechanism illustrated in Fig. 47. Fig. 49 is an end elevation, partly in section, looking toward the right hand end of the mechanism illustrated in Figs. 47 and 48, the cutter head being omitted. Fig. 50 is a horizontal section on the line 50—50 of Fig. 49. Fig. 51 is a vertical cross section on the line 51—51 of Fig. 48. Fig. 52 is a view in front elevation of the rotating cutter head and the stationary cutter plate for severing the corrugated strip into fasteners of predetermined length. Fig. 53 is a sectional view through the stationary cutter on the line 53—53 of Fig. 54, illustrating the action of the knives of the rotary cutter head with relation to the corrugated material and the stationary cutter member. Fig. 54 is a cross section on the line 54—54 of Fig. 53. Fig. 55 is a horizontal section, partly in plan, illustrating a rotary cutter and the chute for directing the fasteners when severed into a receptacle below, the plane of the section being indicated by the dotted line 55—55 of Fig. 56. Fig. 56 is an elevation of the parts shown in Fig. 55, certain parts being in section. Fig. 57 is a plan view of mechanism whereby a straight corrugated strip may be coiled automatically. Fig. 58 is a front elevation of the mechanism shown in Fig. 57. Figs. 59 and 59ª are detail views of parts shown in Figs. 57 and 58. Fig. 60 is a diagrammatic view in perspective illustrating the operations of the machine. Fig. 61 is a plan view of a straight corrugated strip, the toothed front edge of which is parallel to the straight back edge. Fig. 62 shows a preferred form of divergent fastener in plan, end view and rear view, said fastener having been subjected to pressure in order to produce corrugations which are substantially fan-shaped.

The machine frame, speaking generally, embodies a main longitudinal frame 5 and a forwardly extending member 6, the latter being positioned substantially centrally with respect to the main longitudinal frame. The part 5 of the machine frame is composed, mainly, of cross frames connected by runners and by a bed 7, said cross frames being provided with inclined knees 8, 9, at the parts where the grinding mechanisms are positioned. The member 6 of the frame supports the stock-slitting mechanism, the duplex stock corrugating mechanism, and other devices associated with said mechanisms. Main longitudinal frame 5 supports the series of grinding mechanisms, the stock guide boxes by which the two serrated and corrugated strips are directed through the machine, in opposite directions to each other, the feed rolls for moving the serrated and corrugated strips at the required speed through said stock guide boxes and past the grinding mechanisms, the diverging rolls for slightly flattening the corrugated strips along the serrated edges thereof when it is desired to produce fan-shaped fasteners, cutting mechanisms by which the material of the two strips may be severed into predetermined lengths, and the several mechanisms by which the two strips are fed, stopped, and advanced to, or retracted from, the grinding mechanisms, as well as for performing certain minor operations, all as will hereinafter appear.

In addition to the foregoing, the main frame 5 is adapted to carry the mechanisms by which the corrugated strips may be coiled automatically into compact bundles or rolls when the corrugated strips are not compressed and are not cut into lengths, the machine being thus adapted by a certain adjustment of parts to produce either bundles or rolls of coiled material or to produce divergent fasteners of suitable lengths.

The stock to be operated upon in the machine is of a width slightly less than the aggregate width of two fasteners to be produced, said stock being usually contained in a roll, indicated at A in Fig. 60, and this roll is supported by a rod $A^5$, so that the stock may be drawn off as rapidly as required by the operation of the machine. The stock A passes horizontally through a lubricating tank 10, carried by the roll frame member 9, see Figs. 29 and 30. The stock passes over and in contact with a supporting roller 11 at the front of the tank, and over a supporting bar 12 at the rear of the tank, whereby the stock is so guided through the tank as to be coated with grease on both surfaces thereof. From the grease tank 10, the stock passes to and between coöperating slitting rolls B, C by which the stock is split or divided on a zig-zag line so as to produce two strips or lengths $A'$, $A^2$, said strips being provided at their opposing edges with teeth which cross or interlock substantially as shown in Figs. 24 and 60, and after passing the slitting rolls, the stock passes to and between coöperating corrugating rolls D, E, as will presently appear. Positioned between the grease tank and the pair of slitting rolls B, C are guide disks 13, 14 which are in opposing relation to each other and are positioned at the respective sides of the path of feed of stock A as it passes from the grease tank to the slitting rolls and at such a height as to allow the edges of the stock to engage the faces of the disks below their centers rather near their perimeters, as shown in Fig. 29. These guide disks are adjustable with respect to each other for the purpose of handling stock of different widths, and said guide disks are spring supported, in order that the guide disks may yield in either direction in case the metal is not absolutely straight. As shown in Fig. 30, each guide disk is carried by a spindle 15 which is loosely mounted in a bushing 16 so as to engage at its end with a bearing ball 17, thus minimizing the frictional engagement of the guide disk spindle with the device which takes the end thrust on said spindle. The bushing is housed or contained within a sleeve 18 which is clamped adjustably in a support 19 by binding screw 20. The bushing is free to slide endwise within the sleeve 18, and against the tension of a spring 21, said spring being housed within the sleeve 18 and bearing against the inner end of bushing 16. Through the spring 21 and the rear of sleeve 18 passes a rod 22 the inner end of which is provided with a head 23 which engages with the bearing ball 17. Near the outer end of rod 22 is inserted a cotter pin which limits the thrust of spring 21 and allows initial tension on same. The spindle with its attached disk is thus mounted for rotation and sliding movement within the adjustable sleeve 18 in a manner to subject the bushing to the limited action of spring 21, whereby the disk is free to rotate as it engages with the edge of the stock and it is capable, also, of a limited movement with respect to the stock when the latter is not straight. Obviously, the sleeve 18, the disk and the coöperating parts may be adjusted within the supporting member 19 to the various positions required for stock of different widths.

Slitting rolls B, C are carried by shafts $b$, $c$, respectively, the shaft $b$ and roll B being positioned directly over shaft $c$ and roll C, respectively, said roll shafts $b$, $c$, being journaled in proper bearings $b'$, $c'$, respectively, which are provided in housings 9. The slitting rolls are positioned at one side of housings 9 and above and below the path of the stock, the grease tank 10 and guide disks 13, 14 being located in front of said rolls. As shown in Figs. 28 and 29, the journal bearings $c'$ for the lower roll shaft $c$ are stationary within housings 9, but the journal bearings $b'$ for the upper roll shaft $b$ are vertically adjustable within frame member 6 by the rotation of adjusting screws 24, the latter being connected in a suitable way to said bearings $b'$ and journaled in yokes or boxes 25 supported by collars on adjusting screws 24, said adjusting screws 24 being provided at their upper ends with worm gears 26. Said worm gears 26 mesh with worms 27 provided on the respective ends of an adjusting shaft 28, see Figs. 28 and 29, said adjusting shaft being mounted in bearings 30 which are provided on the yoke or box 25. The adjusting shaft is provided intermediate its ends with a square or polygonal part 31 adapted for the reception of a wrench or other implement whereby the shaft may be turned in order to rotate the worms 27 simultaneously so that the worm gears 26 will impart motion to elevating screws 24 for the purpose of simultaneously adjusting the bearings $b'$ so as to raise or lower the upper roll B relative to lower roll C.

The slitting rolls are provided with small independent punches which are so positioned that the ends of the punches on one roll approach the ends of the punches on the other roll with a rolling action for the purpose of cutting a zig-zag line through the central portion of the metal stock A, the result of which is to divide the stock into two strips $A'$, $A^2$ and to simultaneously produce teeth or serrations on the adjacent edges of the two strips, see Fig. 24. In practice, the upper roll B is so adjusted relatively to lower roll C that the points of the punches barely pass each other, but in action the punches of the upper roll operate on the metal to force it in one direction past the punches on the lower roll and on one side of the zig-zag line of division, whereas the punches of the lower roll so operate on the metal at the other side of the zig-zag line of cut as to press that part of the metal past the punches on the upper roll, whereby the two series of rotating coöperating punches operate with precision and certainty in slitting the stock to produce the two serrated strips.

Speaking generally, each slitting roll embodies a rotary head provided with grooved clamping rings, and a series of punches gripped by and between the clamping rings so as to be retained immovably in position in the rotary head, the operating ends of the punches extending a short distance beyond the perimeter of the clamping rings. A practical form of punch is shown in detail in Figs. 21, 22 and 23, by reference to which it will be noted that the punch 32 is made from stock that is square or substantially hexagonal in cross section, the opposite corners being removed sufficiently to allow the punches to clear each other freely when clamped in the notched rings. The sides of the punch are tapered toward the beveled end for clearance, said beveled end of the punch being of such angle as enables the punch to seat solidly upon the beveled perimeter 45ª of the backing ring 45 to be hereinafter described, said punch having cutting edges, which edges are inclined reversely to each other, see Figs. 18 and 23. A relatively large number of punches are employed in each rotary head, said punches being assembled in contacting relation, two of the side faces of each punch contacting with the two adjacent punches so as to have firm bearing sidewise thereon. The punches are sufficient in number to cut two serrations in the stock for each single corrugation to be formed later by the corrugating rolls. D, E. The square end faces 35 of the punches project through and beyond the surface of the rotary head, see Fig. 18, said square ends of the punches on one slitting roll being positioned relatively to the corresponding ends of the punches on the other roll so that the cutting edges on the respective punches will clear or pass each other.

The rotary head for each slitting roll B, C is constructed as shown more particularly in Fig. 18, said rotary head embodying a hub sleeve 36 which is provided at one end with a disk 37, the other end of said hub sleeve being externally threaded at 38, whereby another disk 39 may be screwed upon the hub sleeve, said disks 37, 39 being parallel for the purpose of supporting rings 40, 41 by which the punches 33 are gripped. The parallel disks 37, 39 are provided on their opposing faces with shoulders 42 which constitute the seats for the punch clamping rings 40, 41. Said clamping rings are parallel to each other and concentric to the roll shaft, the opposing edges of the rings being provided with grooves 40ª, see Fig. 20, said grooves in the rings being in register with each other and of a shape to accommodate the edge portions of punches 33. Hub sleeve 36 of the rotary punching head is fitted on an end portion of the roll shaft so as to be keyed thereto at 36ª. The roll shaft is externally threaded for the reception of clamping nuts 43, 44 adapted to engage with the respective end portions of the hub sleeve, whereby said rotary head is clamped rigidly to and retained in fixed position longitudinally on the roll shaft. Disk 39 of the rotary head is adjustable on the threaded portion of the hub sleeve by rotating said disk in one direction or the other, for the purpose of moving clamping ring 41 toward or from the punches, and thus the clamping rings are adapted to be tightened upon the punches by an adjustment of disk 39 relative to disk 37. For the purpose of taking up the end thrust of the punches when cutting the metal, the rotary head is provided with a backing ring 45, the latter being positioned intermediate disks 37, 39 and fitting snugly upon an unthreaded part of hub sleeve 36. This backing ring is in the plane of the series of punches 33 so that the punches are seated firmly upon the perimeter of said backing ring. As shown, the backing ring is provided with a beveled or inclined perimeter 45ª and said backing ring is adjustable on the hub sleeve lengthwise thereof, for the purpose of setting the punches accurately in position with respect to the external surface of the rotary head. The adjustment of backing ring 45 may be effected by any suitable means, but, as shown, the head is provided with a separate adjusting ring 46, the latter being screwed upon the threaded portion 38 of the hub sleeve. Said adjusting ring is provided with sockets 47 adapted to receive a suitable tool or tools, for the purpose of applying pressure to said ring in order to rotate it upon the hub sleeve, access to the sockets of the adjusting ring being obtained through slots 48 provided in clamping ring 41. Said adjusting ring 46 is positioned substantially within clamping ring 41, between backing ring 45 and clamping disk 39. It will be observed that the adjustable disk 39 and nuts 43, 44 are provided with sockets 49 for the reception of suitable implements adapted to exert pressure upon the rings, in order to adjust said rings upon the threaded portions of the hub sleeve and the roll shaft, respectively, said roll shaft being provided with a collar 49ª which is adapted to bear against the adjacent ends of bearings, b', c'. As shown, the clamping ring 40 which is seated upon disk 37 engages with dowels 50 which are fixed in the disk 37 and enter holes in the ring 40 so as to restrain the latter from rotary movement upon the head. The backing ring 45 is engaged on one side by set screws 51, the latter being threaded through disk 37 so that access may be had to the screws for the purpose of tightening them against the backing ring when the latter shall have been adjusted to the required position upon the hub sleeve by the rotation of adjusting ring 46, said adjusting ring 46 and said screws 51 operating to clamp the backing ring fixedly in position within the rotary head.

As hereinbefore stated, the slitting rolls operate upon the stock A to divide the same lengthwise into two strips A', A², and as these strips are divided and pass from the slitting rolls they enter a guide which is positioned between the slitting rolls and the corrugating rolls, said guide operating to keep the two strips together edgewise and to confine them closely flatwise, so that the serrated portions of the strips will be unable to lap each other and the two strips will be properly directed to the corrugating rolls. This guide, shown more particularly in Figs. 9 and 11 of the drawings, consists of a lower member 52 and an upper member 53 held together by suitable means and supported upon the front roll housing 9. The upper guide member 53 is provided with a bevel edged slot 54 which exposes the serrated portions of the two strips as they lie engaged with each other within the guide and will thereby enable the operator to set the edge guides 53ª, by means of the adjusting bolts with wing nuts 53ᵇ, so as to suit stock of different widths and guide the same centrally to the corrugating rolls D, E.

Corrugating rolls D, E are carried by shafts d, e, respectively, roll D and its shaft d being positioned directly above the companion roll E and its shaft e. Shaft e of the lower roll E is journaled in stationary bearings 55 provided in roll housing 9, but the shaft D of the upper roll is journaled in bearings 56 which are adjustable vertically within said roll housings. To the bearings 56 are connected adjusting screws 57, which screws extend through housing caps 58 fastened to roll housings. Screws 57 are provided with worm gears 59 which mesh with worms 60 on an adjusting shaft 61, the means for adjusting the bearings of the upper corrugating roll being similar in construction and operation to the means hereinbefore described for adjusting the bearings of the slitting roll. The detailed construction of the corrugating rolls is shown in Figs. 25 and 26, by reference to which it will be seen that each roll D or E embodies a rotary head 62 and two roll members 63, 64, said roll members being provided with rounded teeth 63ª, 64ª, respectively. Members 63, 64 of each roll, D or E, are relatively arranged to bring their teeth 63ª, 64ª in staggered relation, that is to say, the teeth 64ª on roll member 64 are quarter way between or in advance of the teeth 63ª on roll member 63. This relative arrangement of the teeth on the companion members of each corrugating roll results in forming the corrugations in such relation to the teeth upon the strips of metal as to bring the projecting point of each serration midway between the high and low curves of a corrugation. The four members composing the two corrugating rolls are intended to be so positioned relatively to each other that a corrugation in one strip is formed by two coöperating members 63, 63 of the rolls D, E one half way between the corrugations formed in the other strip by the other two coöperating members 64, 64 of the two rolls D, E, instead of the corrugations being exactly reversed. In Fig. 27, the full lines show the corrugations in one strip and the dotted lines illustrate the corrugations in the other strip, the corrugations in the two strips being produced by the action of the two-part companion rolls D, E on the two strips A′, A².

Each roll shaft is provided with a collar 65 and with a threaded end 66, on which threaded end is screwed a nut 67. The rotary head 62 is positioned on an end portion of the roll shaft for engagement with collar 65 against which it is clamped by the action of the nut 67, said head being keyed to the shaft as at 68. The head is provided intermediate its ends with a radial flange 69, and upon the head is seated the roll members 63, 64, said members being positioned at the respective sides of the flange 69. The clamping bolts 70 are provided for the purpose of securing the roll members 63, 64 to the flanged heads 62, roll members 64 being slotted (Fig. 25) to allow of adjustment relative to roll members 63 and roll members 63 being located definitely on flanged heads 62 by means of dowels 71, whereby the roll members are secured to the head in the proper relative positions to produce the strip with corrugations as shown in Fig. 27.

The shafts of the slitting rolls and the corrugating rolls are driven by an arrangement of gearing, technically termed "square gearing", the arrangement being such that a moderate adjustment of the bite of either the slitting or corrugating rolls does not materially affect the accuracy of the engagement of the driving gears.

72 designates a roll driving shaft which is journaled in suitable bearings 73 provided in frame member 6 intermediate the bearings c′ and 55 of the shafts c, e for the lower slitting roll C and the lower corrugating roll E, respectively. At one end this roll driving shaft 72 is provided with a bevel gear 74 with which meshes a bevel pinion 75, the latter being secured rigidly near the lower part of an inclined countershaft 76. Said countershaft is at the rear of frame member 6, its lower part being journaled in a bearing 77 rigidly attached to frame member 6, the upper part of said shaft extending through frame member 5 and being journaled in a bearing 78, see Fig. 7. The upper rear end of inclined countershaft 76 is provided with a bevel gear 79 which meshes directly with a bevel gear 80, the latter being fastened on the main drive shaft F, said drive shaft being positioned at the rear of frame member 5 and extending longitudinally thereof, as shown more clearly in Figs. 3, 4, 6, 7 and 8 of the drawings, said drive shaft F being journaled in bearings f provided at suitable intervals upon the rear of frame member 5. The roll driving shaft 72 is provided with a wide spur gear 81, and meshing with this spur gear are two gears 82, 83 secured, respectively, to the shafts c, e, of the lower slitting roll C and lower corrugating roll E, respectively, whereby the two lower rolls C, E are driven positively and at the required speed directly from the roll driving shaft 72. The face of gears 82, 83 is one half the width of the face of gear 81, thus leaving one half of gear 81 free from engagement by gears 82, 83 on the lower roll shafts, but the remainder of the face of gear 81 is in mesh with a gear 84, the latter being secured rigidly to a counter-roll-driving shaft 85. Said counter-roll-driving shaft is journaled in bearings 86 which are mounted in the frame member 6 directly above roll-driving shaft 72, said shaft 85 being positioned intermediate the shafts $b$, $d$ of upper rolls B, D, respectively. The gear 84 of said shaft 85 meshes directly with gears 87, 88, the latter being secured directly to roll shafts $b$, $d$, respectively, whereby the upper rolls B, D are driven positively from countershaft 85 which in turn is driven by main roll shaft 72.

The gears 82, 87 on shafts $c$, $c'$ of the slitting rolls, the gears 83, 87 on the shafts $d$, $e$ of the corrugating rolls, and the gears 81, 84 on shafts 72, 85, the positions of all of said gears being indicated by dotted lines in Fig. 11, are made of such diameter that with the assistance of a moderate change in cutting diameter of the circular rows of punches on the slitting rolls, said slitting rolls will act upon the metal stock A at a sufficiently greater speed than the corrugating rolls in order to compensate for the extra metal which is taken up by the process of corrugating the strips A', A², and to secure, also, a proper register in the operation of the slitting rolls and the corrugating rolls upon the stock material.

One of the corrugating roll shafts (shaft $d$ of roll D) and the two slitting roll shafts (shafts $b$, $c$ of rolls B, C) are provided with means for effecting a slight adjustment around their several centers. Such adjustment is secured by the employment of a hub 90 on each gear 82, 87, 88, said hubs being keyed to shafts $b$, $c$, $d$, and being adjustably clamped by bolts 91 to gears 82, 87, 88, respectively. The gears between shafts 72, 85, and roll shafts $b$, $c$, $d$, $e$ are always in the same relative positions to each other, while the clamping devices may be released and the roll shafts $b$, $c$, $d$ may be rotated upon their respective centers relative to the gears, after which the gears may be clamped rigidly in position upon their respective shafts by means of the hubs.

The described construction enables the shafts of the two slitting rolls, and the shaft of one corrugating roll to be adjusted on their axes relative to the train of driving gears for the purpose of securing accuracy in the operation of the corrugating rolls upon the serrated strips and for bringing the slitting rolls and the corrugating rolls into harmonious action with respect to each other. After the stock has been slitted to produce the two serrated strips, and said strips have been corrugated, as hereinbefore described, the two serrated and corrugated strips A', A² are carried upwardly to and between two pairs of corrugated feed rolls G, G' and H, H', one of said strips running to the left and between rolls G, G' and the other strip running to the right and between rolls H, H'. At or about the points at which the serrated and corrugated strips change their course, they are so bent or twisted that the toothed edges of both strips point toward the front side of the machine, and this enables the use of substantially flat faced guide disks I, I', for the purpose of taking up the decided backward thrust which is given to the strips due to the fact that the rapidly running strips are bent or twisted in the manner described. The strips A', A² run lengthwise of frame member 5, one strip A' running from rolls G, G' toward the left end of the machine and through a substantially horizontal guide box J, whereas the other strip A² is fed by rolls H, H' toward the right hand end of the machine and through another substantially horizontal guide box J'. The guide disks I, I' are positioned intermediate the two sets of feed rolls G, G' and H, H', respectively, and said disks are adapted for engagement with the smooth, straight back edges of the two strips A', A².

Guide boxes J, J' are positioned lengthwise of frame member 5, and at the respective sides of rolls G, G' and H, H'. At the outer ends of said guide boxes are positioned other feed rolls K, K' and L, L', similar to feed rolls G, G' H, H', said feed rolls operating to impart movement to the two strips A', A² from the corrugating rolls D, E to and through the guide boxes. Said guide boxes serve to present the toothed edges of the corrugated strips to the several sets of grinding wheels employed in the machine, it being preferred to position each guide box J or J' in coöperative relation to three sets of grinding wheels, two sets of grinding wheels M, M' and N, N' operating to produce bevels at certain angles on the toothed edge of each strip, whereas the third set of grinding wheels O, O' operate on the toothed edge of each strip so as to impart the finish thereto and to remove the bur of metal which may be produced on the teeth by the action of the two first named grinders.

A supporting bracket or frame member 92 is provided on the longitudinal frame member 5 in a position opposite to and above the slitting and corrugating rolls, said frame member or bracket 92 being provided with bearings in which are mounted shafts 93, 94, the front ends of said shafts being extended beyond the front of the frame member or bracket 92 for the purpose of receiving feed rolls G', H', respectively. Said feed rolls, and the devices associated therewith, are shown in Figs. 31 to 36, inclusive, each upper feed roll G', H' being provided with a peripheral flange g, h, respectively. The shaft 94 at one end of the frame member or bracket 92 extends from the rear of the machine through the bracket, the rear part of said shaft being provided with a bevel gear 95 which meshes with a bevel pinion 96, the latter being provided on main driving shaft F, whereby said shaft 94 is geared directly to the main driving shaft. Shaft 94 is provided with a spur gear 97, and shaft 93 is provided with another spur gear 98, the two spur gears 97, 98 being connected operatively by intermediate idler gears 99, 100. Said idler gears are mounted on suitable stub shafts 101 projecting beyond the rear of bracket or frame member 92, whereby the idler gears operate to transmit the motion from the shaft 94 to shaft 93, and thus the two feed rolls G', H' are positively driven by gearing from the main driving shaft, the two feed rolls G', H' rotating in opposite directions to each other for the purpose of feeding one strip toward the left hand end of the machine and the other strip toward the right hand end of the machine. It is to be noted that the shafts 93, 94 of the upper feed rolls G', H' are mounted in stationary bearings in bracket or frame member 92, whereby said feed roll shafts may be driven to good advantage from the main driving shaft. The lower feed rolls G, H, respectively are positioned a suitable distance below the upper feed rolls G', H' so as to coöperate therewith. The lower feed rolls are plain disks or rollers, positioned within the flanges g, h of the feed rolls G', H', see Fig. 33, and the rolls G, G' of one pair as well as the rolls H, H' of the other pair, are in such relation to each other as to have the proper bite upon the corrugated strips. The feed rolls may be plain smooth surfaced rolls, but it is preferred to employ feed rolls having corrugated surfaces, the teeth of the corrugated rolls being rounded in order to properly mesh with the corrugations in the two strips without exerting substantial pressure thereon.

Lower feed rolls G, H are mounted on spindles 102, 103, the latter extending into frame member or bracket 92, and being positioned directly below the shafts 93, 94 which carry the upper feed rolls G', H'. The shafts of the lower feed rolls are not positively driven, but they are mounted for free rotation in bearings 104 provided in carrier or bell-crank lever 105, whereby the spindles and their rolls G, H are supported for oscillating adjustment relative to the upper positively driven feed rolls G', H'. The oscillating carrier or bell-crank lever is forked or bifurcated so as to resemble a yoke, and this lever or carrier is positioned within frame member or bracket 92 as shown in Figs. 35 and 36. The upstanding part of the carrier or bell-crank is pivotally supported within bracket 92 by horizontal pintles or trunnions 106, the outer ends of said trunnions being supported in the bracket 92, and the inner portions of the trunnions extending through the upstanding part of the carrier or bell-crank. The pivots 106 of the carrier or bell-crank extend through the upstanding parts thereof above spindles 102, 103 of the rolls G, H, said pivots being at right angles to the spindles, see Fig. 36. The horizontal portion of the carrier or bell-crank is slotted as shown in Figs. 34 to 36, inclusive, said horizontal portion of the bell-crank or carrier being extended so as to form an arm 107 which projects rearwardly beyond bracket 92, said rearwardly extending arm being provided with an antifriction roller 108, see Figs. 35 and 36. Secured rigidly to the forward part of the pivoted carrier or bell-crank, below the pivots 106 thereof, are bolts 109 to which are connected springs 110, said springs being anchored at their lower ends on bolts or studs 111 attached rigidly to frame or bracket 92, said springs 110 serving to swing carrier or bell-crank 105 on its pivots 106 in a direction which will move rolls G, H away from coöperative relation to rolls G', H', respectively. When starting the machine, and during the operation of the machine, the friction roller 108 is engaged by a cam plate on a cam bar to be hereinafter described, the effect of such engagement being to retain the pivoted carrier or bell-crank in position against the tension of its springs 110, thus holding the lower idle feed rolls G, H in coöperative relation to the upper positively driven feed rolls G', H'.

Guide disks I, I' are mounted on spindles i, i', said spindles extending rearwardly through suitable bearings provided in a forked carrier 112, see Figs. 34 to 36, inclusive. The carrier 112 is positioned within the upwardly extending bifurcated portion of carrier or bell-crank 105, said carrier 112 being pivotally supported on the inner end portions of the pivots 106, whereby carrier 112 is mounted on the same pivots as the carrier or bell-crank 105. The two carriers 105, 112 are thus supported within the fixed bracket 92 for movement on the same axis, thereby securing a compact arrangement of the parts which support the two lower feed rolls and the two disks. The spindles i, i' of the guide disks extend rearwardly through the carrier 112, and these rear ends of the spindles are connected pivotally by a bolt 113 to an upstanding arm of a bell-crank 114. This bell-crank is fulcrumed by a bolt 115 in the fixed bracket or frame member 92, said bell-crank having a rearwardly extending arm 114ª which is provided at its free rear end with an antifriction roller 116, see Fig. 35. The bell-crank 114 is positioned above the arm 107 of the pivoted carrier or bell-crank 105, and the roller 116 is positioned for engagement with a cam plate of a cam bar to be hereinafter described. The bell-crank is connected operatively with the spindles $i$, $i'$ of guide disks I, I' in a manner to impart sliding movement to said spindles for the purpose of withdrawing the guide disks from their operative positions when the serrated and corrugated strips are withdrawn from the grinding mechanisms by movement imparted to the guide boxes J, J', prior to stopping the machine, the rearward movement of said guide disks I, I' permitting of the withdrawal of the serrated and corrugated strips from the grinding mechanism without bending or distorting said strips. The guide disks are retained normally in their operative positions by the action of a spring 117 which is shown in Fig. 35 as being connected with the arm 114$^a$ of the bell-crank 114, the other end of said spring being anchored in a suitable way on the frame member or bracket 92. The spring 117 acts to lift the bell-crank and to thrust spindles $i$, $i'$ in a forward direction, thus retaining the guide disks in proper positions relative to the two sets of feed rolls and to the path of feed of the toothed and corrugated strips, whereby the guide disks are properly presented for engagement with the smooth plain back edges of the two strips.

The carrier 112 for the spindles of the two guide disks is provided with an upwardly extending member 118, and through this member extends a spindle 119 provided with a cross member 120. Said spindle is positioned in a vertical plane intermediate the spindles $i$, $i'$ of the two guide disks, the spindle extending forwardly and over the guide disks. The member 120 of the spindle is positioned forwardly of the two sets of guide rollers, said spindle and its cross member serving to direct the strips A', A² when introducing them into the machine. In the carriers 105, 112 for the shafts of the feed rolls and the spindles of the guide disks are provided suitable passages or pipes 121 whereby a lubricant may be supplied to the shafts and spindles, as desired.

The guide boxes J, J', by which the serrated edges of the corrugated strips are presented to the grinding mechanisms, are positioned in front of, and parallel to, the bed 7 of frame member 5, see particularly Figs. 12 and 15, the detailed construction of the guide boxes being represented in Figs. 12 to 15 and Figs. 37 to 40, both inclusive. The machine bed 7 is provided with guide openings 122, through which loosely pass parallel stems 123, said stems projecting at their respective ends beyond the machine bed 7 and the stems being slidable freely in the openings 122. The front ends of the stems 123 are reduced somewhat so as to form shoulders 124, and these reduced ends of the stems pass loosely through openings 125 which are provided in each guide box J or J'. From this description it is apparent that each guide box is supported on the reduced ends of the stems for sliding movement relative thereto, and said stems are supported in the machine bed 7 for sliding movement relative to the latter, whereby the guide boxes are adapted to slide upon the stems independently of any movement of the stems themselves and said guide boxes are capable, also, of sliding with the stems. Each guide box is moved in one direction by the action of a suitable spring mechanism 126 for the purpose of retaining the rear of the guide boxes in contact with the shoulders 124 of the stems, said shoulders acting to limit the rearward movement of the guide box under the impulse of the springs and with relation to the shoulders of the stems. The guide box, J or J', is provided with a socket 127 in which is housed a spring 126, the rear end of the spring being attached to an adjusting screw 128, whereas the front end of the spring is retained in position by an anchor pin 129, see Fig. 14. The adjusting screw 128 is threaded into a socket provided in bed 7 of the frame, the attached end of the screw having a slot 130 in which fits one end of spring 126, said screw extending forwardly from the bed 7 into the socket 127 so that the nick of the screw is accessible by a screw-driver inserted into the socket 127 of the guide box. It is apparent that the spring acts to draw the guide box rearwardly on the reduced ends of the stems and into contact with shoulders 124, but this spring may be detached from the bed in order that an operator may pull the guide box forwardly and out of engagement with the reduced forward ends of the sliding supporting stems 123.

In previous machines for making corrugated fastener metal, the operations of starting and stopping the machine have resulted in a considerable loss of metal owing to the action of the grinding wheels upon the metal after the feed of the metal through the machine has been arrested. In the present machine we avoid all such loss of metal by withdrawing the corrugated metal from contact with the grinding mechanisms simultaneously with the operation of stopping the machine. In attaining this end, means are provided for adjusting the guide boxes for the corrugated metal relative to the grinding mechanisms simultaneously with the operations of starting the machine and in carrying out this part of the invention, we employ a cam bar P which is operatively connected with the several parts which are to be controlled, to wit, the clutch mechanism Q for starting and stopping the operation of main driving shaft F, the cam mechanisms by which the guide boxes J, J' are moved toward and from the grinding mechanisms, the means for throwing the several sets of feed wheels into and out of the coöperative relation so as to impart the desired movement to the serrated and corrugated strips, and the means by which the guide disks are moved into and out of operative relation to the path of feed of the serrated and corrugated strips.

The cam mechanism for moving the guide boxes relative to the grinding mechanisms is shown more particularly in Figs. 9, 12, 15, 15ª, 15ᵇ, said cam mechanism being associated with the sliding stems 123 which support the guide boxes. The cam bar P is positioned at the rear of the frame member 5, and it is supported for slidable movement therein by any suitable means, said cam bar extending for practically the length of the frame. The cam bar is provided with cam plates 131 adjacent to the rear ends of sliding stems 123, said cam plates being fastened by bolts 132 to the cam bar, and the front edges of said plates having traveling contact with the rear face of the machine bed 7. Each cam plate is provided with a longitudinal slot 133 which is offset at one end, as at 134. The rear end of stem 123 is forked as at 135 in order that the cam plate may have sliding engagement with said forked end of the stem, and in this bifurcated part of the stem is positioned a roller 136 which rotates on a pin 137, said roller being positioned to travel in the slot 133 of the cam plate. It is evident that the cam plate will travel with the cam bar when the latter is moved in either direction. When the rollers 136 of these stems occupy the straight part of the slots 133, the sliding stems are thrust forward for the purpose of presenting the guide boxes J, J' in position relative to the grinding wheels for the latter to act upon the serrated edges of the corrugated strips, but a movement of the cam bar and the cam plates in an opposite direction will present the offset parts 134 of the cam slots into position for engagement with the rollers 136 so that the movement of the cam plates will act upon the sliding stems 123 for the purpose of withdrawing the guide boxes rearwardly toward bed 7, said rearward movement of the guide boxes being effected primarily by the springs 126, whereby the guide boxes will be moved away from the grinding mechanisms so as to withdraw the serrated edges of the corrugated metal from the grinding wheels. It is preferred to employ a clip plate 138 in connection with each cam plate 131, said clip plate embracing the cam plate at or about the middle thereof, and said clip plate being fastened in position by a bolt 139, see Figs. 15ª and 15ᵇ.

Each guide box J or J' is constructed substantially as shown in Figs. 37 to 40, both inclusive, by reference to which it will be seen that said box consists of an upper longitudinal member j, a lower longitudinal member j', and one or more end members j², said members j, j', j² being fastened rigidly together so as to produce a solid unitary structure. The longitudinal members j, j' are constructed to provide a chamber 140 which accommodates a backing plate 141 for the strip of corrugated metal, said backing plate being composed preferably of hardened steel. The chamber 140 in the guide box is substantially closed along the front longitudinal side of said guide box by coöperating wear plates 142, 143, said wear plates being composed of steel. The wear plates are positioned between the front edges of the top and bottom members j, j' of each guide box, and said wear plates are attached to the guide box and retained in parallel spaced relation to each other by bolts 144, said bolts having threaded engagement with the wear plates so as to hold them parallel to each other and provide a space 145 between the opposing faces of the plates, through which space the corrugated strip is fed by the action of the feed rolls embodied in the machine. The top wear plate 143 is provided with a notch or recess 146 shown in full lines in Fig. 40 and in dotted lines in Fig. 39, whereas the bottom wear plate 142 is provided with a notch or recess 147 shown in dotted lines in Figs. 39 and 40, said notches or recesses 146, 147 being out of register with each other in order to properly accommodate the two grinding wheels composing the set. These notches 146, 147 are provided at intervals in the wear plates of the guide box, as shown in Figs. 37 and 38, in order that all the grinding wheels of the three sets may operate upon the strip of corrugated metal which is fed through the space 145 between the wear plates. At other points in the length of the wear plates the front of the space 145 is closed by plate 148 which is attached by screws 149 to one of the wear plates, see Figs. 37 to 40, inclusive. The space 145 at the rear of the wear plates is closed by means of the backing plate 141, the latter fitting snugly between the wear plates 142, 143 so that the front edge of the hardened backing plate is presented for engagement with the smooth plain back edge of the corrugated strip. The backing plate is adjustable within the guide box in a direction for regulating the depth of the space 145 through which the corrugated metal passes, in order to suit different widths of corrugated metal and to compensate for wear. Suitable means are provided for effecting this adjustment of the backing plate. As shown, the backing plate is rigidly fastened to a bar 150 which is positioned within chamber 140 for movement therein toward and from wear plates 142, 143. This adjusting bar 150 extends for practically the length of the guide box, and at suitable intervals, said adjusting bar is provided with transverse recesses in the under side thereof. Secured rigidly in each recess of the adjusting bar is a short rack 152, the teeth of which are in engagement with one of a series of spur gears 153, which spur gears are carried by a shaft 154. The shaft extends lengthwise of the guide box, said shaft and the gears thereon being contained within a chamber 155 provided in lower member $j'$ of the guide box, see Figs. 39 and 40. The shaft 154 is mounted in the guide box for rotation freely therein, and at one end this shaft is provided with a spiral gear 156, indicated in dotted lines in Fig. 39. This spiral gear meshes with a spiral gear 157, the latter being attached to a shaft 158 supported in end piece $j^2$ of the guide box, see dotted lines in Fig. 39. The shaft 158 is inclined across the guide box at one end thereof, one end of said shaft being extended beyond the guide box and having an exposed polygonal head 159 which is adapted for the reception of a wrench or other implement by which the shaft may be rotated at will. It is evident that the shaft 158 may be turned for rotating the shaft 154 by which the gears 153 are turned in order to impart motion to racks 152 so as to adjust the bar 150 and the backing plate 141 within the guide box. Provision is thus made for easily and quickly changing the position of the backing plate to suit corrugated metal of different widths, and, also, to so adjust the backing plate as to compensate for wear.

It will be noted that three grinders M, M', N, N' and O, O' are associated with each guide box, J or J', said grinders being positioned at intervals in the length of the guide box in order that the grinding wheels will operate in the notches 146, 147. The grinders M, M' and N, N' are shown in detail in Figs. 41 to 43, whereas grinder O, O' is shown in Figs. 44 to 46. The grinders M, M' and N, N' are employed for removing the metal along the serrated edge of the corrugated strip necessary to produce the bevels on the respective faces of said strip, for which purpose said grinders act at a certain flat angle on the stock, whereas grinder O, O' (which is the final grinder) operates on the beveled serrated edges of the stock for the purpose of producing a certain angle to the points of the teeth or serrations whereby the teeth are given a form which produces strong teeth and enables them to easily penetrate the wood, said final grinder O, O' acting on the teeth at a sharper angle than the two main grinders M, M', N, N'.

For supporting each of the two main grinders, the machine frame is provided with a knee-shaped member 8, the parts of which are inclined reversely to each other in order to so position the grinding wheels M, M' (or N, N') that they will act at certain angles upon the respective faces of the corrugated strip, at the serrated edge thereof, thereby removing the metal from the corrugated strip to produce the required bevels thereon during the operation of feeding the said corrugated strip through each guide box.

In addition to the knees 8 for the two main grinders, the machine frame is provided with two additional knee-shaped members 9, one for each final grinder O, O'. The knee 9 is similar to the knee 8 for the reason that it embodies two parts inclined reversely to each other, but the wheels O, O' of each final grinder are so supported on the inclined parts of the knee 9 that the said wheels O, O' act at steeper angles on the stock, to wit, on the beveled faces of the serrations or teeth in the corrugated strip, for the purpose of giving such form to the serrations or teeth as will produce teeth which penetrate easily into the wood and which possess the required strength. As shown, each knee 8 or 9 is supported in frame member 5 in a vertical position and by suitable means which enables said knee to be adjusted for a limited distance relative to the guide box J or J'. The end portions of the knee are provided with sole plates 157, against which ride the wheels 158, the latter being journaled in slides 159 which are guided for movement in brackets 160 of the frame member 5, said slides being adjusted by the rotation of screws 161 which are supported in the brackets and are suitably connected to the slides.

The grinding mechanism embodying the wheels M, M' or N, N' is associated with means for supporting and adjusting said wheels substantially as shown in Figs. 41, 42, 43, of the drawings. Said grinding wheels M, M' or N, N' are secured rigidly to shafts $m$, and these shafts are mounted in bearings $m'$ of adjustable carriages 162, 163, respectively. The carriages 162, 163 are supported for sliding movement on beds 164, the latter being secured firmly to the oppositely inclined members of the knee 8, whereby the carriages 162, 163 are adapted for movement in oppositely inclined paths relative to the stock which is guided by the guide box, J or J'. Each carriage 162 or 163 is adapted for movement upon its bed 164 by the rotation of an adjusting screw 165, said adjusting screw being operatively connected with the carriage. The adjusting screw is supported in a fixed bearing 166 provided on the bed 164, and the movement of this screw is effected by the rotation of a hand wheel 167. The carriages 162, 163 and the grinding wheels mounted in the respective carriages are adjustable independently of each other by the manipulation of screws 165. It is to be observed, that the grinding wheels M, M' (or wheels N, N') are so positioned that their adjacent edges will overlap, although the two wheels are spaced, as shown in Fig. 2, to provide ample clearance between the wheels in order to preclude contact thereof. The grinding wheel M' acts upon the upper face of the corrugated strip at the serrated edge thereof in order to produce a bevel at one angle upon said strip, whereas the grinding wheel M acts upon the lower face of the corrugated strip at the serrated edge thereof for the purpose of producing the bevel on the lower face of said strip, the two bevels being produced by the grinding wheels upon the respective faces of the strip while the strip is moving lengthwise with respect to the guide boxes. The same result is secured by the action of the grinding wheels N, N' upon the strip. The employment of two sets of grinders, as described, in connection with each strip will remove the metal required to produce the beveled teeth upon the corrugated strip, but it is evident that the numbers of pairs of grinding wheels may be increased, if desired, independently of the final grinders O, O'.

The main grinders M, M', N, N' have their carriages supported by bed plates 164 which are substantially parallel to the respective inclined portions of the knees 8, but the wheels of the final grinder, illustrated in Figs. 44, 45 and 46 are mounted on carriages, which carriages are slidable upon beds inclined with respect to each member or portion of the knee 9, in order that the final grinders will act upon the previously beveled edges of the corrugated strip, in a manner to give a certain form to said teeth. The final grinders O, O' of each pair are carried on shafts $o$, $o'$, respectively, which shafts are mounted in bearings $o^2$ of sliding carriages 168, 169, respectively. Said slidable carriages 168, 169 are fitted upon bed plates 170, the latter being attached firmly to the inclined members of the knee 9. Each bed plate 170 is inclined or tapering, as shown in Fig. 44, so that the carriage is movable in a path inclined to that part of the knee upon which the bed 170 is affixed. By positioning the carriages for movement in paths inclined to the face of the knee, the grinding wheels O, O' are caused to overlap each other at their adjacent edges to a greater extent than the overlap between the grinding wheels M, M' or N, N', as will be seen by a comparison of Fig. 44 with Fig. 44, and thus the final grinders O, O' are positioned in such relation to the corrugated strip that the grinding wheels act upon these beveled serrations at a different angle from the main or preliminary grinders M, M' or N, N'. The sliding carriages 168, 169 of the final grinders are adjusted to the required positions relative to the path of the stock by screws 171, each screw being mounted in a fixed bearing arm 172 on the knee 9. Screws 171 are connected separately to the carriages 168, 169, and the movement of these screws is effected by the rotation of hand wheels 172.

The grinders are positively driven by power connections with shafts R, R' positioned at the rear of the machine frame, the shaft R being below the main drive shaft F, whereas shaft R' is above said main drive shaft. Said shafts R, R' are journaled in proper bearings $r$ of the longitudinal frame member 5, and they are driven in opposite directions from a countershaft $R^2$, shown more particularly in Fig. 4. The countershaft is itself driven in one direction by a pulley 173 and belt 174 from a primary driving pulley 175. Said shaft $R^2$ is provided with two pulleys 176, 177. From the pulley 176 runs a belt 178 which operates upon a pulley 179 on the shaft R', for the purpose of driving the latter in one direction. The other pulley 177 on the shaft $R^2$ drives a cross belt 180 which runs to and around a pulley 181 on the shaft R, whereby the shafts R, R' are driven simultaneously and in opposite directions by the belts 178, 180, respectively. The shaft R' is provided with a series of pulleys 182 around which passes a series of belts 183, each belt 183 runs around a pulley 184 attached to the shaft $m'$ or $o'$ of one of the upper grinders, whereby the shaft R' is adapted to simultaneously impart motion to all the upper grinders of the two series associated with the guide boxes J, J'. The other shaft R is provided with a series of belt pulleys 185 around which run a series of belts 186, the latter passing around pulleys 187 on the shafts of the lower grinders M, N, O, respectively, so that the lower shaft R operates to simultaneously drive all the lower grinders of the two series associated with the guide boxes J, J', respectively. In our machine the shafts R, R' operate to drive the grinders of the upper series and the grinders of the lower series simultaneously and in opposite directions, said grinders remaining in motion while the material to be operated upon is adapted to be moved into and out of position relative to the edges of the grinders by the adjustment of the guide boxes. In other words, the operations of starting and stopping the machine do not affect the rotation of the grinders, for the reason that the latter continue to rotate whether the other parts of the machine are idle or are in service. Obviously, however, the main driving pulley 175 and belt 174 may be stopped in order to completely arrest all the parts of the machine.

In a practical embodiment of the invention each knee 8 for the main grinders has its parts inclined at an angle of 20° from the vertical, so that the two first sets of grinding wheels will approach each strip of metal at an angle of 30° from the vertical, and finish the edge of the metal to this angle. By mounting the grinding wheels to approach the metal at an angle normal to the edge of the metal cut which is desired, the edge of the metal cut will be ground to practically the same angle and form without regard to the reduction in diameter of the grinding wheels through wear. The variation in angle in this case is so little as to be negligible. This arrangement permits the establishment of a fixed line for the position of the serrated edge of the metal as it passes the grinding wheels. In prior machines for producing this corrugated metal, the grinding wheels have been arranged to approach the metal at right angles to its side surfaces, thereby necessitating the adjustment of the stock guides as the grinding wheels were reduced in diameter.

At the delivery or left hand end of guide box J is positioned a frame member 188 attached to the main frame 5 in a suitable way, said frame member supporting a pair of feed rolls for the stock, a guide disk 189 and a pair of divergent rolls S, S'. At the delivery or right hand end of the other box J' is another frame member 190 suitably attached to the main frame 5. This frame member 190 supports the feed rolls L, L' which are positioned adjacent to the delivery end of guide box J' for operating upon the corrugated metal passing therethrough. In addition to the feed rolls L, L', the frame member carries a guide disk 191 and a pair of divergent rolls T, T'. The rolls K, K' and L, L' operate upon the two strips of corrugated metal to insure the feed of said metal through the respective guide boxes J, J' and the two pairs of divergent rolls S, S' and T, T' act upon the two strips of corrugated metal along the toothed edge thereof, in a manner to somewhat compress one edge portion of the corrugated metal as it passes between the rolls, in order to impart a certain divergency to the metal, whereby the subsequent operation of cutting the metal into lengths will produce individual fasteners which are substantially fan-shaped that is, each fastener will be slightly concave on its rear untoothed edge, and slightly convex on its serrated edge, as shown more particularly in Fig. 62.

The feed rolls K, K' and L, L' at the delivery ends of the guide boxes J, J' are similar in construction and operation, so that a description of one set of feed rolls will answer equally for the other, reference being made more particularly to Figs. 47 to 51, both inclusive, said figures representing the devices at the delivery end of the guide box J' and including the feed rolls L, L' and the divergent rolls T, T'.

The feed rolls L, L' are mounted on shafts $l$, $l'$, respectively, the shaft $l$ of the upper feed roll being journaled in a bearing of frame member 190 and extending rearwardly therethrough, said shaft $l$ being provided at its rear portion with a bevel gear 192. The upper feed roll L' is provided with a flange $l^2$, and with this feed roll L' coöperates the lower feed roll L, it being preferred to provide said feed rolls L, L' with rounded teeth, so that the feed rolls will engage with the corrugated strip without exerting pressure thereon. The shaft $l$ of the lower feed roll L is supported in one part of an oscillating carrier or bellcrank 193, said carrier or bellcrank being forked or bifurcated. The carrier or bellcrank has an upstanding portion positioned within frame member 190 and through this upstanding portion extends the alined bolts or spindles 194, see Figs. 50 and 51, whereby the bellcrank or carrier is pivotally supported within the frame 190. The bell crank is provided with a rearwardly extending arm 195 on which is journaled a roller 196, and to the front part of said pivoted carrier or bellcrank are connected springs 197, said springs being anchored on the frame member 190. The springs are adapted, under certain conditions, to act upon the pivoted carrier or bellcrank in a manner to raise the arm 195 at the rear and to depress the front part of the pivoted carrier or bellcrank, the latter turning on the pivot 194, whereby the shaft $l$ and feed roll L are moved downwardly so as to withdraw the lower feed roll from coöperative relation to the upper feed roll when it is desired to arrest the feed of the corrugated metal through the machine.

The divergent rolls T, T' are positioned one above the other and supported on an end portion of frame member 190 at the opposite end from feed rolls L, L'. Roll T is preferably a smooth cylindrical roll, whereas roll T' is a substantially conical roll with a smooth surface. Said roll T' is provided with a circumferential flange $t^2$ which is positioned to overlap one face of the complemental roll T. The conical divergent roll is carried on shaft $t$, which shaft is journaled in bearings of frame member 190. At its rear, shaft $t$ is provided with a gear 198, which meshes with an idler gear 199, the latter being journaled on a stub shaft 200 positioned at the rear of frame member 190. The gear 199 meshes with a spur gear 201 forming a part of beveled gear 192, and thus the shaft of divergent roll T' is driven positively by gears 198, 199 and 201 from the shaft l' of feed roll L'. The bevel gear 192 meshes with a beveled pinion 202 provided at one end of a short shaft 203 which is positioned at the rear of shafts l', t' of rolls L' and T'. Said shaft 203 is in a bearing 204, and at the other end it is provided with a bevel gear 205 which meshes with a bevel gear 206 on a cross shaft 207, the latter being journaled in a bearing 208 on the main frame. This cross shaft occupies a horizontal position at the left hand end of main frame 5, and at the rear of said cross shaft it is provided with a beveled gear 207ᵃ which meshes with a bevel gear 207ᵇ secured rigidly to one end of main drive shaft F, see Fig. 3, whereby shaft 207 is driven by the main shaft, and said shaft 207 drives the short shaft 203 from which power is derived for the operation of the positively driven rolls L', T'.

The cylindrical roll T is mounted on a shaft t' which shaft is journaled in bearings of the pivoted carrier or bellcrank 193, the shaft l of the idle feed roll L being positioned at one side of the pivoted carrier or bellcrank, whereby the two lower rolls L, T are mounted in the pivoted carrier or bellcrank for movement therewith, so that said rolls L, T will be adjusted into and out of coöperative relation to the upper driven rolls L', T' by the movement of the bellcrank or pivoted carrier. The divergent rolls T, T' are positioned in coöperative relation to each other so that the part of roll T' of greater diameter will act upon the corrugated strip adjacent to the serrated or toothed portion thereof, the effect of rolls T, T' upon the corrugated strip being to compress the corrugations at the serrated edge thereof, in a manner to impart a curvature or slight fan-shape to the corrugated metal.

Intermediate the pair of feed rolls L, L' and the pair of divergent rolls T, T' is a guide 211, said guide being suitably supported on frame member 190 and having an opening adapted to receive the corrugated strip, said opening of the guide 211 being in the horizontal plane of the pass between rolls L, L' and the pass between divergent rolls T, T'.

Positioned rearwardly of the guide 211 is a guide disk 191, the same being attached to a shaft 212. This shaft is mounted for sliding movement in a carrier 213, said carrier being pivotally supported on the bolts or spindles 194 by which the carrier or bellcrank 193 is pivoted in the frame member 190. The carrier 213 is positioned in the forked or bifurcated part of bellcrank or carrier 193 so as to support the guide disk 191 in proper position for engagement with the straight plain back edge of the corrugated strip as it passes through the guide 211 from feed rolls L, L' to the divergent rolls T, T'. The spindle 212 of the guide disk is pivoted to the upstanding arm of a bell-crank 214 by a pivotal bolt 215, said bellcrank being provided with a horizontal arm 216, on the rear end of which is mounted a roller 217. The bellcrank is lifted normally by a spring 218 which acts to impel the spindle 212 and the disk 191 to a forward position so that the guide disk will normally occupy a position for engagement with the back edge of the corrugated strip.

When the machine is employed for producing divergent fasteners of the kind shown in Fig. 62, the corrugated strips pass from the divergent rolls directly to rotating cutters U, V, the cutter U being at the left end of the machine so as to coöperate with the strip A' which passes through the guide box J, the feed rolls K, K' and the divergent rolls S, S', whereas the cutter V is positioned at the right end of the frame for operation upon the strip A² adapted to travel through the guide box J' and between feed rolls L, L' and divergent rolls T, T'. The cutter heads U, V are similar in construction, and hence a description of one will answer for the other. Each cutter head comprises a rotating conical head 219, a series of blades 220, and a stationary cutter blade 221, reference being had, more particularly, to Figs. 47, 48, 52, 53, 54, 55, and 56. The stationary cutter blade 221 is carried by a bracket or post 222, the latter being firmly fastened to a part of the machine frame 5. Said bracket is provided with a dove-tail guideway 223, see Figs. 54, 55, one side of the dove-tail guideway being a plate 224 which is held in position by bolts 225. The upper part of the bracket 222 is provided with a ledger plate 226, the upper surface of which is inclined, so that a strip of the corrugated metal will pass over the ledger plate in a path inclined to the direction of feed of the corrugated metal as it is advanced by the feed rolls and after it passes through the divergent rolls, see Fig. 53. The stationary cutter blade 221 is supported by the bracket in position for its upper cutting edge to extend above the inclined face of the ledger plate, and this stationary cutter blade is fixed adjustably in position, the adjustment of the cutter blade in a vertical direction being effected by the rotation of an adjusting screw 227, see Fig. 53.

The shaft 207 which drives the upper rolls L', T' is extended through the bearing 208 and beyond the front side of the machine, the forward end of said shaft being supported in a bracket 228 which is secured rigidly to frame member 5, see Fig. 56. The conical cutter head 219 is provided with a hub sleeve 229, said cutter head being fastened in a suitable way to the forward end portion of shaft 207. As shown in Fig. 55, the hub sleeve 229 is externally threaded for engagement with a nut 230 which is screwed on the sleeve and is positioned to embrace an end portion of shaft 207. The knives 220 are fitted in a sidewise direction against the conical part of the head, each knife being fastened rigidly in position by a suitable means, such as the bolts 231. The working ends of the knives 220 extend beyond the end of the cutter head of largest diameter, and these knives are arranged to sweep past the cutting edge of the stationary cutter blade 221, as diagrammatically represented in Fig. 53, whereby the rotation of the knives of the cutter head of the shaft will cause the extended ends of the knives to coöperate with the cutter blade 221 in a manner to sever the corrugated strip at regular intervals. From this description it is apparent that the outer flat sides of the knives 220 are in line with the angle of the cone, whereas the cutting portions of the rotary knives project from the larger diameter of said cone. The ratio of the rotative speed of the cutter head to the lineal speed of the strip of corrugated metal is such that a given number of knives upon said cutter head will sever pieces of metal containing a certain number of corrugations. For cutting pieces of metal with greater or less corrugations, it is preferred to employ cutter heads with other numbers of knives.

In case it is desired to produce coiled corrugated metal, as distinguished from divergent fasteners of suitable length, the divergent rolls S, S' and T, T' are thrown out of action by adjusting the lower cylindrical rolls S, T, so that they will not contact with the corrugated metal, the cutter heads are removed from the machine and the stationary cutter knives are disconnected from their supporting brackets. When the cutter heads are detached from the cutter shafts 207, a sleeve 232 is slipped on each cutter head shaft, as shown in Fig. 58, for the purpose of precluding the key in the shaft from interfering with the passage of the metal. The removal of the stationary cutter knives is to prevent the cutting edges thereof from becoming dull by the passage over said edges of the metal strips. Each metal strip is then carried to a coiling mechanism indicated, generally, by the reference character W. A supporting bracket 233 is attached to an end portion of the frame so as to extend outwardly therefrom and in alinement therewith, said supporting bracket being positioned beyond the cutter head shaft 207. Said bracket is provided with a journal bearing 234, in which is positioned a shaft 235 which carries the coiling head, the latter being positioned beyond the corrugated cutter head shaft so that the corrugated metal will pass below the sleeve 234 and be delivered directly to the coiling head, as shown in Fig. 58. A disk 236 is fastened detachably to shaft 235, said disk being provided with a plurality of hand holes 237, the purpose of the latter being to facilitate the removal from the machine of the disk and the metal which is coiled against the face thereof. Extending outwardly from the disk is a central spindle 238, upon which is slipped a core 239, the latter being composed, preferably, of wood. This wooden core is provided with an aperture adapted to receive a stud 240 which is carried by the disk 236, for the purpose of locking the core to the disk and insuring the conjoint rotation of said core with the disk and the shaft. The wooden core is provided with suitable means, such as a slit cut into the perimeter thereof, for the rigid attachment of an end portion of the corrugated metal to the core, and to the outer end of this core is applied a cover plate 236ª, the latter being engaged with the spindle and clamped in a suitable way against said spindle. The length of the core is equal substantially to the width of the metal which is to be coiled upon the core and between the disk and the cover plate. The coiling spindle is provided at one end with a belt pulley 241, the latter being engaged by a belt 242 which is driven from a pulley 243 on the cutter head shaft 207. The belt and pulleys operate to drive the coiling device at such a speed as to take up the metal as fast as it is delivered to said coiling device at the beginning of the coiling operation, but thereafter the belt slips enough upon the pulleys to take up the metal without giving it undue tension. For this purpose, a belt tightener is employed, said tightener consisting of a pulley 244 which is positioned for engagement with the belt intermediate the pulleys 241, 243. Said tightener pulley is mounted for rotation freely on a stud of a swinging arm 245 which is pivoted at 246 to bracket 233, and to the free end of this arm is connected a tension device, the latter being in the form of a drop weight 247 carried by a cable 248, the upper end of which is attached to the arm 245, all as clearly shown in Figs. 57, 58. When the coil has been completed to a size suitable for handling, the machine is stopped, the corrugated metal is severed near the coil, the end of said corrugated metal is secured and the large disk, the core and the cover plate together with the intermediate coiled metal are removed from the machine, the hand holes 237 in the large disk enabling the operator to grasp the coil and the disk together.

As shown in Figs. 52, 55 and 56, the rotating cutter head at each end of the machine frame is positioned within a housing 249 attached to the frame member 5 or 190, said housing extending downwardly below the cutter head, so as to terminate in a chute, see Fig. 52, whereby fasteners which are cut to the desired length are adapted to be delivered into suitable receptacles.

The main driving shaft F is driven by a belt 251 on a power pulley 252, said belt operating on a combined balance wheel and pulley 250, the latter being mounted loosely on shaft F so as to be driven continuously from the power pulley. This balance wheel is provided with a clutch member 253 with which engages a sliding clutch member 254, the latter being keyed to driving shaft F. Said slidable member of the clutch mechanism is loosely engaged by one arm of a lever 255, said lever being fulcrumed by a pin 256 on a bracket 257, the latter extending rearwardly from the main frame to which it is rigidly attached in any suitable way. Said lever 255 is forked or bifurcated at one side of its fulcrum 256 for the purpose of producing two arms 258, 259, see Fig. 15. The arm 258 is provided with a roller 258ª, whereas the other arm 259 is provided with another roller 259ª. On the cam bar P is rigidly secured a cam plate 260, said cam plate extending rearwardly from the bar and being provided with recesses 261, 262. When the clutch lever is in a position to disengage the clutch member 254 from the balance pulley, the roller 258ª of arm 258 is in the recess 261 of the cam plate, as shown by full lines in Fig. 15. A movement of the cam bar and the cam plate toward the right in Fig. 15 will reverse the position of lever 255 so as to throw the clutch member 254 into engagement with the balance pulley for the purpose of making said balance pulley fast with the main drive shaft F, in which event, the lever and its two arms will be reversed in position, as shown by dotted lines in Fig. 15, so that the roller of arm 259 will occupy the recess 262 of the cam plate. It will be noted that the movement of the lever 255 is effected by the action of the cam on the rollers of said lever, and when one roller is in a recess of the cam plate, the lever is held in a locked position so as to preclude an accidental movement of the clutch.

The cam bar P is provided with a series of cams 263 which are positioned for engagement with the rollers 108 on the pivoted carriers or angle levers 105 of the central feed rolls G, H and the rollers 196 of the pivoted carriers or angle levers 195 for operating the lower feed rolls K, L and the lower divergent rolls S, T, so that the cams 263 will act upon said rollers 108, 196 in a manner to simultaneously depress the central feed rolls G, H away from the positively driven feed rolls G', H', also, to positively depress the feed rolls K, L away from the positively driven feed rolls K', L', and, also, to move the divergent rolls S, T away from the positively driven divergent rolls S', T', respectively, whereby all the lower rolls will be shifted sufficiently with relation to all the upper rolls, respectively, in a manner to arrest the feed of the stock through the machine and to throw the divergent rolls out of action.

In addition to the cam plates 263, cam bar P is provided with other cam plates 264 which are positioned for engagement with the roller 116 on the bellcrank 114 associated with central guide disks I, I' and with the rollers 217 on the bellcranks 216 associated with the guide disks 191 at the respective ends of the machine, whereby the cam plates 264 will act upon the rollers 116 and 217 for the purpose of withdrawing the guide disks with relation to the path of feed of the corrugated material at the same time that the guide boxes J, J' are operated by the cam plates 131, for the purpose of withdrawing the corrugated material from the several grinding mechanisms, the rearward movement of the guide disks I, I' and 191, permitting of the backward movement of the corrugated material with the guide boxes J, J'.

The cam bar P is operated by a vertical rock shaft 265 positioned at the rear of the machine and back of the cam bar, said rock shaft being journaled in suitable members 266 of the frame 5, see Figs. 12 and 13. Said rock shaft is provided with a short arm 267 and a longer arm 268, the short arm 267 being pivoted to the cam bar by a pin or bolt 269ª. The longer arm 268 of the rock shaft extends forwardly and beneath the bed 7 of the machine frame and one of the guide boxes J, the forward end of said arm 268 being pivoted to a link 269, said link being pivoted at 270 to a starting bar 271. This starting bar is positioned at the front of the frame and it extends, preferably, the full length thereof, so that the starting bar is accessible to the operator at any point intermediate the length of the frame. As shown in Figs. 12 and 13, the starting bar is supported for sliding movement in guide lugs 272 of the main frame.

In order to withdraw the corrugated metal from contact with the grinding wheels at the time of stopping the machine, and to bring the same into grinding contact with these wheels when starting the machine the cams 131, 260, 263, 264 upon the cam bar are so timed as to perform the different operations upon the balance wheel, clutch mechanism Q, the bellcranks 105, 195 for the feed rolls and the divergent rolls, the bellcranks 114, 216 for the central and end guide disks and the slidable stems 123 for the guide boxes J, J' in the following sequence: When the machine is to be started, the metal being in position through the guide boxes and between the feed rolls and the divergent rolls, the cam bar is moved in such a direction as will bring the stock guides carrying the two strips of corrugated metal forward to position said metal strips into contact with the grinding wheels of the several mechanisms, the guide disks I, I', 191 are simultaneously moved forward so as to follow up the metal strips and to maintain contact with the back edge of said metal strips, (see Fig. 16ᵃ) the feed rolls and the divergent rolls are brought into operative position, and into contact with the metal strips (see Fig. 16ᵇ) and the clutch is thrown into engagement with a balance pulley. The machine being in operation, it is stopped by a movement of the cam bar in the reverse direction, the effect of which movement is to disengage the clutch from the balance pulley and to stop the operative movements of all parts of the machine except the grinding wheels, the feed rolls and the divergent rolls being released from the corrugated metal, the guide disks are withdrawn from the rear edge of the metal strips, and the stock guides simultaneously withdraw the metal strips from contact with the grinding wheels. These operations are performed consecutively, in the order named, by the movement of the cam bar to start or stop the machine, one continuous movement of the cam bar in one direction operating to stop the machine in so short a time as to preclude any damage to the corrugated metal from the action of the grinding wheels. It is not necessary to stop the grinding wheels at any time for either of the purposes of entering the stock into the machine, removing the stock from the machine, or when the machine is stopped to remove the coiled metal.

The operation of the machine when constructed and operated to produce individual divergent fasteners is as follows:—The metal is introduced through the grease box 10, through the slitting rolls B, C, the corrugating rolls D, E, into engagement with the guide disks I, I', one corrugated strip being carried to the left through the feed rolls G, G' the guide box J, the feed rolls K, K' and the divergent rolls S, S', whereas the other corrugated strip is led to the right between feed rolls H, H', the guide box J', the feed rolls L, L' and the divergent rolls T, T'. When it is desired to start the machine, the operator moves the starting bar so as to impart movement in one direction to the cam bar, the effect of which is to throw the clutch mechanism Q into engagement with the balance pulley, for the purpose of driving the main shaft F, and to position all the lower rolls G, H, K, L, S and T into coöperative relation to the upper rolls G', H', K', L', S' and T', thereby imparting movement to the several working parts. It is to be noted at this point that the slitting rolls B, C, the corrugating rolls D, E, and the two cutting mechanisms U, V are driven directly from main drive shaft F. The slitting rolls act upon the metal stock to divide the same longitudinally and to simultaneously produce serrations on the adjacent edges of the two strips resulting from the operation of the slitting rolls. The two strips then pass directly to the two part corrugating rolls D, E which act upon the strips to produce the corrugations therein. The metal strips are fed through the machine by the four sets of feed rolls, and these strips are presented so that the serrations thereof point toward the front of the machine, the plain smooth back edges of the two strips contacting with the guide disks I, I', 191. The guide boxes J, J' present the serrated edges of the corrugated strips to the several grinding mechanisms M, M', N, N' and O, O' which act to remove the required metal from the serrated edges of the two strips and to produce teeth of the desired form on said strips. The strips pass between the divergent rolls S, S' and T, T', the conical rolls S' and T' acting upon the strips, adjacent to the serrated edges thereof, so as to result in the production of substantially fan-shaped fasteners when cut by the cutting mechanisms U, V. The action of the divergent rolls S, S' and T, T' is to effect a physical change in the condition of the corrugated strips. When the strips pass through the machine up to and between the feed rolls K, K', L, L', said strips are straight, but when the strips are subjected to the pressure of the divergent rolls S, S', T, T', they are curved, for the reason that the corrugations of the strips on the serrated edges thereof are flattened, owing to the curvature given to the corrugated strips, they cannot be coiled into compact bundles, and it is for this reason, as well as to produce individual fasteners, that the cutting mechanisms U, V are employed for severing the corrugated strips into fasteners of proper length. As the corrugated, ground and compressed strips leave the divergent rolls, they are acted upon immediately thereafter by the cutting mechanisms, the blades of which cut through the strips so as to produce individual fasteners, which drop through the chutes 249 into suitable receptacles.

When it is desired to coil the corrugated metal into compact bundles, the divergent rolls S, T are moved out of coöperative relation to the companion divergent rolls S', T', the cutter heads and the stationary knives are moved from the machine, the sleeves 232 are positioned on the cutter shafts 207, and the coiling heads are properly attached to the coiling shafts 235 as hereinbefore described. The corrugated strips after passing the feed rolls K, K', L, L' travel idly over the brackets which support the stationary knives and beneath the sleeves 232 on the cutter shafts 207, each corrugated strip being coiled upon the core 231 which is positioned between the disk 236 and the cover plate 236ª. The coiling heads are driven by the belt and pulley connections with the cutter shafts 207 at the rate of speed required to coil the corrugated strips upon the coiling heads, but as the coiling heads increase in diameter, the driving belts 242 slip relatively to their pulleys so as to result in winding the corrugated strips upon the rolls of increasing diameter without producing undue tension upon the corrugated metal.

As shown, the machine is adapted for producing individual fasteners of predetermined lengths, each having divergent corrugations or being substantially fan-shaped, substantially as represented by Fig. 62, or the machine may be operated to produce a bundle or coil of corrugated metal, the penetrating edge of which is substantially parallel to the straight back edge, as shown in Fig. 61. It is evident, however, that the machine may, under some circumstances, be provided with a coiling head W at one end, and the divergent rolls, as T, T', and cutting mechanism V, at the other end, see Fig. 60, whereby the same machine may produce the divergent individual fasteners of Fig. 62 and the corrugated fastener metal of Fig. 61 in a compact coil or bundle, although it may be preferred to operate the machine to produce individual fasteners at both ends or to produce coiled corrugated metal at both ends.

While the machine has been shown and described as adapted for producing two corrugated and serrated strips which are sharpened and cut or coiled, it is apparent that said machine may be constructed to produce simultaneously more than two strips by duplicating its working parts.

The divergent fastener X shown in Fig. 62 is composed of a single piece of metal, of proper length and width suitable for the work intended. The fastener is provided with corrugations $x$, at one edge the fastener is serrated so as to produce teeth $x'$ which are beveled at $x^2$ by grinding. The corrugations $x$ taper from the rear non-penetrating edge to the serrated beveled edge, and this result is due to the compression of the corrugations adjacent to the serrated edge by the action of the divergent rolls S, S' or T, T' upon the corrugated strip prior to cutting the fastener from the length of metal. The effect of compressing the corrugated metal is to impart a slight curvature to the metal, the serrated edge being slightly convex and the rear edge slightly concave, see Fig. 62, the fastener being substantially fan-shaped in plan view. This curvature of the corrugated metal strip renders it difficult to coil the strip into a compact bundle, and, accordingly, the metal is cut into lengths to produce the individual fasteners. When the corrugated metal is not compressed by the employment of the divergent rolls, the front and rear edges are parallel, or substantially so, as in Fig. 61, and metal of this form can be readily and expeditiously coiled into a compact bundle, as heretofore described.

Having thus fully described the invention, what we claim as new, and desire to secure by Letters Patent is:—

1. In a machine for producing corrugated fasteners, the combination of stock slitting and serrating mechanism for producing a plurality of strips each of which is serrated at one edge thereof; means for corrugating each strip, and means for sharpening the serrated edge portion of said strips.

2. In a machine for producing corrugated fasteners, the combination of stock slitting and serrating mechanism for producing a plurality of strips each of which is serrated at one edge portion thereof, means for corrugating each strip so as to produce corrugations in register with the serrated edges of the strips and result in sawtooth edges on said strips, means for feeding stock to said slitting and serrating mechanism, and means for sharpening the sawtooth edges of said corrugated strips.

3. In a machine for making corrugated fasteners, the combination of means for slitting flat metal stock and simultaneously therewith producing serrations on one edge of the resulting separate strips, means for corrugating the serrated edged strips, and means for sharpening the strips on the serrated edge portions thereof.

4. In a machine for making corrugated fasteners, the combination of stock slitting rolls provided with dies for producing at the slitting operation serrations on one edge of each of the resulting strips, corrugating mechanism for operating on said serrated edge strips, and means for sharpening the strips on the serrated edges thereof.

5. In a machine for making corrugated fasteners, stock slitting and serrating mechanism embodying coöperating rolls provided with punches for simultaneously slitting and serrating flat metal stock to produce a plurality of serrated edge strips, combined with means for feeding flat stock to said rolls, means operating upon the serrated strips subsequently to the slitting and serrating operation for corrugating said strips, and means for sharpening the serrated edge portions of said strips.

6. In a machine for making corrugated fasteners, stock slitting and serrating mechanism embodying coöperating rolls provided with separate detachable punches for simultaneously slitting and serrating flat metal stock to produce a plurality of serrated edge strips, means for simultaneously corrugating said strips, and combined with means for feeding flat stock to said coöperating rolls, means operating upon the strips subsequently to the slitting and serrating thereof for corrugating said strips, and means for sharpening the serrated edges of said corrugated strips.

7. In a machine for making corrugated fasteners, stock slitting and serrating mechanism embodying coöperating rolls provided with separate punches and with means for adjusting said punches lengthwise, combined with means for feeding flat stock to said coöperating rolls, corrugating mechanism operating upon the separate strips subsequently to slitting said stock, and means for sharpening the serrated edges of said corrugated strips.

8. In a machine for making corrugated fasteners, the combination of stock slitting mechanism for producing a plurality of strips from flat metal stock, corrugating mechanism embodying coöperating rolls each of which is provided with two series of corrugations, the corrugations in one series of each roll being staggered with respect to the corrugations in the other series of said roll, and means for sharpening the corrugated strips.

9. In a machine for making corrugated fasteners, the combination of stock slitting mechanism for producing a plurality of strips from flat metal stock, corrugating mechanism embodying coöperating rolls each of which is provided with two members provided with corrugations and means whereby said members may be rotatively adjusted on their axes so that the corrugations on one member of each roll may be staggered with reference to the corrugations on the other member of said roll, and means for sharpening the resulting corrugated strips.

10. In a machine for making corrugated fasteners, the combination of stock slitting and serrating mechanism, corrugating mechanism for operating upon the strips resulting from slitting the metal stock, means for effecting a relative adjustment of one mechanism to the other so that the corrugations are properly positioned with reference to the serrations, and means for sharpening the resulting strips on the serrated edges thereof.

11. In a machine for making corrugated fasteners, the combination of stock slitting mechanism, duplex corrugating rolls for producing corrugations in the resulting metal strips so that the corrugations of one strip are in staggered relation to the corrugations in the other strip, and means for sharpening the resulting corrugated strips.

12. In a machine for making corrugated fasteners, the combination of means for slitting flat metal stock and simultaneously producing serrations on one edge of each of the resulting strips, means for corrugating said strips, and means for beveling the serrated edges of said corrugated strips to sharpen the same.

13. In a machine for making corrugated fasteners, the combination of means for slitting flat metal stock into strips and for simultaneously serrating one edge of each strip, means for simultaneously corrugating the strips, and means for simultaneously grinding the serrated edges of said strips for producing saw tooth points with sharpened edges.

14. In a machine for making corrugated fasteners, the combination of means for slitting flat metal stock into separate strips, means for serrating one edge of each of the resulting separate strips, means for corrugating said serrated edged strips, means for sharpening the serrated edges of said strips, and additional means for sharpening the points of said serrations.

15. In a machine for making corrugated fasteners, the combination of means for slitting flat metal stock into strips and for simultaneously serrating one edge of each strip, means for simultaneously corrugating the strips, means for sharpening the serrated edges of said strips to produce saw teeth thereon, and additional means for sharpening the points of said serrations.

16. In a machine for making corrugated fasteners, the combination of means for corrugating and serrating a metal strip, means for sharpening the serrated edge of the strip, and additional means for subsequently sharpening the points of the serrations.

17. In a machine for producing corrugated fasteners, the combination of means for serrating and for corrugating a metal strip, means for sharpening the serrated edge of the strip, said sharpening means being positioned at an angle to the direction of feed of said strip, and means for giving a quarter turn to said strip at a point intermediate the serrating and corrugating means and the sharpening means.

18. In a machine for producing corrugated fasteners, the combination of means for slitting metal stock to produce a plurality of strips one edge of each strip being serrated simultaneously with the slitting operation, means for sharpening the serrated edges of the separate strips, and means positioned intermediate the slitting means and the sharpening means for directing said separate strips into different paths whereby the strips are guided to said sharpening means.

19. In a machine for making corrugated fasteners, the combination of stock-slitting mechanism for producing a plurality of separate strips, means for corrugating said strips, means for sharpening an edge portion of said strips, and means for compressing said corrugated strips near one edge thereof for imparting a tapering form to the corrugations of said strips.

20. In a machine for making corrugated fasteners, the combination of stock-slitting and serrating mechanism for producing a plurality of separate strips with serrated edges, means for corrugating said strips, means for sharpening the strips on the serrated edges thereof, and means for compressing the corrugated strips near the serrated edges thereof for increasing the width of the corrugations on the serrated edges thereof.

21. In a machine for making corrugated fasteners, the combination of stock-slitting mechanism for producing a plurality of separate strips, means for corrugating said strips, and means for sharpening an edge portion of said strips, means for compressing said corrugated strips near one edge thereof for imparting a tapering form to the corrugations of said strips.

22. In a machine for making corrugated fasteners, the combination of stock-slitting and serrating mechanism for producing a plurality of separate strips with serrated edges, means for corrugating said strips, means for sharpening the strips on the serrated edges thereof, and means for compressing the corrugated strips near the serrated edges thereof for increasing the width of the corrugations on the serrated edges thereof.

23. In a machine for making corrugated fasteners, the combination of stock-slitting and serrating mechanism for producing a plurality of separate strips with serrated edges, means for corrugating said strips, means for sharpening the strips on the serrated edges thereof, and coöperating rolls for diverging the corrugations near the serrated edges of said corrugated strips.

24. In a machine for making corrugated fasteners, the combination of mechanism for slitting metal stock and serrating one edge of each of a plurality of resulting metal strips, means for corrugating said serrated strips, a plurality of sharpening mechanisms, means for giving a quarter turn to each of said corrugated strips at points intermediate the corrugating mechanism and the sharpening mechanisms, and means for feeding the strips in the direction of their length and past the sharpening mechanisms.

25. In a machine for making corrugated fasteners, the combination of stock-slitting and serrating mechanism, means for producing corrugations on the resulting serrated metal strips, means for sharpening the serrated edge of each corrugated strip, a guide through which each corrugated strip is free to run past the sharpening mechanism, said guide being movable relative to the sharpening mechanism and operating to present the serrated edge of the metal strip in operative relation to said sharpening mechanism, means for deflecting the direction of feed of the corrugated strip at a point intermediate the corrugating mechanism and the sharpening mechanism, and means for feeding each corrugated strip in the direction of its length.

26. In a machine for making corrugated fasteners, the combination of stock-slitting and serrating mechanism, means for corrugating the resulting serrated metal strips, means for sharpening the serrated edge of each corrugated strip, strip-guiding means positioned in coöperative relation to the sharpening mechanism, means for feeding the strip in the direction of its length, means for changing the direction of movement of the strip intermediate the corrugating mechanism and the strip-guiding means, and means for moving the strip-guiding means relative to the sharpening mechanism upon the stopping of said feed mechanism.

27. In a machine for making corrugated fasteners, the combination of mechanism for slitting and serrating metal stock, mechanism for corrugating the resulting metal strips, a plurality of sharpening mechanisms positioned to act simultaneously upon one edge of said strips, means for directing one strip into operative relation to one sharpening mechanism, means for directing the other of said strips into operative relation to the other sharpening mechanism, and separate feeding mechanisms in the path of said separate strips for moving them lengthwise and past the respective sharpening mechanisms.

28. In a machine for making corrugated fasteners, the combination of stock-slitting mechanism, mechanism for corrugating the resulting metal strips, a plurality of sharpening mechanisms positioned to act simultaneously upon one edge of said strips, means for feeding one strip in one direction and relative to one of said sharpening mechanisms, and means for feeding the other strip in an opposite direction and relative to the other of said sharpening mechanisms.

29. In a machine for making corrugated fasteners, the combination of stock-slitting means, mechanism for corrugating the resulting metal strips, a plurality of sharpening mechanisms positioned to act simultaneously upon one edge of said strips, strip-guiding means positioned in coöperative relation to said sharpening mechanisms, means for moving said strip-guiding means relative to the sharpening mechanisms, feed mechanisms for imparting movement to the strips for feeding them in the direction of their lengths, and means for changing the direction of movement of the strips intermediate the corrugating mechanism and the strip-guiding means.

30. In a machine for making corrugated fasteners, the combination of stock-slitting means, means for corrugating the resulting metal strips, means for simultaneously sharpening one edge of said strips, means for simultaneously feeding the strips lengthwise, a plurality of strip-guiding boxes positioned in coöperative relation to the respective sharpening mechanisms, and a plurality of rotatable strip-guiding disks positioned intermediate the corrugating mechanism and the strip-guiding boxes, said disks being positioned for contact with the edges of the strips which are not acted upon by the sharpening mechanisms.

31. In a machine for producing corrugated fasteners, the combination of stock slitting mechanism for producing a plurality of strips each provided with serrations on one edge thereof, a plurality of corrugating mechanisms each of which is effective in producing on one of said strips corrugations in register with the serrations on the strips, and means for sharpening the serrated edges of said strips.

32. In a machine for producing corrugated fasteners, the combination of stock slitting and serrating means, and corrugating means operating upon said strips subsequently to the division of the stock by said slitting mechanism.

33. In a machine for producing corrugated fasteners, the combination of stock slitting and serrating means whereby there results a plurality of strips each provided with serrations on one edge thereof, corrugating means operating upon said strips subsequently to the division of the stock by said slitting means, and means for beveling the serrated edges of said corrugated strips.

34. In a machine for producing corrugated fasteners, the combination of stock slitting means for producing a plurality of strips each provided with serrations on one edge thereof, corrugating means operating upon said strips subsequently to the division of the stock by said slitting means, means for sharpening the serrated edges of said corrugated strips, and guiding means positioned intermediate the corrugating means and the sharpening means, said guiding means contacting with a smooth straight edge of the strip.

35. In a machine for producing corrugated fasteners, the combination of stock slitting means, corrugating means operating upon the strips resulting from the division of the stock by said slitting means, sharpening means positioned for contact with one edge portion of said strips, and rotatable guide disks positioned for contact with a smooth edge of the strips, said guide disks being yieldable relatively to the path of said strips.

In testimony whereof we have signed our names to this specification in the presence of two subscribing witnesses.

SPENCER C. CARY.
CHAS. S. WEEKS.

Witnesses:
M. C. RODRIGUEZ,
H. T. BERNHARD.